(12) United States Patent
Alnasser et al.

(10) Patent No.: US 12,547,962 B2
(45) Date of Patent: Feb. 10, 2026

(54) GENERATIVE DIFFUSION MACHINE LEARNING FOR RESERVOIR SIMULATION MODEL HISTORY MATCHING

(71) Applicant: SAUDI ARABIAN OIL COMPANY, Dhahran (SA)

(72) Inventors: Mohammed Hashim Alnasser, Al Khobar (SA); Marko Maucec, Englewood, CO (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 166 days.

(21) Appl. No.: 18/324,758

(22) Filed: May 26, 2023

(65) Prior Publication Data

US 2024/0394636 A1    Nov. 28, 2024

(51) Int. Cl.
*G06Q 10/0637*    (2023.01)
(52) U.S. Cl.
CPC .............................. *G06Q 10/06375* (2013.01)
(58) Field of Classification Search
None
See application file for complete search history.

(56) References Cited

U.S. PATENT DOCUMENTS

| | | | | |
|---|---|---|---|---|
| 2017/0031048 A1* | 2/2017 | Hilpert | ..................... | E21B 49/00 |
| 2018/0188403 A1* | 7/2018 | Halsey | ..................... | G01V 1/306 |
| 2018/0291729 A1* | 10/2018 | Wilson | ..................... | E21B 47/13 |
| 2020/0160460 A1* | 5/2020 | Fricke | ..................... | G06N 3/088 |
| 2021/0192388 A1* | 6/2021 | Cunningham | ........... | G06N 3/09 |
| 2022/0268148 A1* | 8/2022 | Fulton | ..................... | E21B 49/00 |
| 2023/0036713 A1* | 2/2023 | Pattnaik | .................... | G06T 5/60 |
| 2024/0312202 A1* | 9/2024 | Jiang | ..................... | G06V 20/10 |

FOREIGN PATENT DOCUMENTS

| | | | | |
|---|---|---|---|---|
| WO | WO-2017024082 A1 * | 2/2017 | ........... | E21B 47/125 |
| WO | 2022/178507 A1 | 8/2022 | | |
| WO | 2024/181870 A1 | 9/2024 | | |

OTHER PUBLICATIONS

Wu et al, Learning large-scale subsurface simulations with a hybrid graph network simulator, InProceedings of the 28th ACM SIGKDD Conference on Knowledge Discovery and Data Mining, pp. 4184-4194, Aug. 14, 2022 https://dl.acm.org/doi/pdf/10.1145/3534678.3539045 (Year: 2022).*

(Continued)

*Primary Examiner* — Octavian Rotaru
(74) *Attorney, Agent, or Firm* — Osha Bergman Watanabe & Burton LLP

(57) ABSTRACT

A method for generating history matched grid data. The method includes obtaining observed production data and obtaining latent grid data. The method further includes processing the observed production data to form observed latent production data and generating denoised latent grid data by removing noise from the latent grid data using a diffusion model guided by the observed latent production data and a time encoding. The method further includes generating history matched grid data by decoding the denoised latent grid data and optimizing production of a well using the history matched grid data.

17 Claims, 11 Drawing Sheets

(56) References Cited

OTHER PUBLICATIONS

R. Rombach et al.; "High-Resolution Image Synthesis with Latent Diffusion Models", arXiv:2112.1075v2; Apr. 13, 2022; pp. 1-45 (45 pages).
International Search Report issued for corresponding international patent application No. PCT/US2024/030834, mailed Sep. 24, 2024 (5 pages).
Written Opinion issued for corresponding international patent application No. PCT/US2024/030834, mailed Sep. 24, 2024 (7 pages).

\* cited by examiner

GENERATIVE DIFFUSION MACHINE LEARNING FOR RESERVOIR SIMULATION MODEL HISTORY MATCHING

BACKGROUND

Oil and gas extraction from subsurface rock formations requires the drilling of wells using drilling rigs mounted on the ground or on offshore rig platforms. Once drilled, the wells may access hydrocarbon reservoirs. In the context of oil and gas exploration and production, a variety of tools and methods are employed to model subsurface regions and plan wellbore paths to extract desired hydrocarbons. Reservoir characterization, such as assessments of reservoir quality and production estimates, is typically performed using one or more models of the subsurface over a region of interest in conjunction with a computational simulation (e.g., using a reservoir simulator).

Subsurface models may include spatial distributions of properties of the subsurface formations. For example, subsurface models may indicate the density, porosity, permeability, and/or resistivity throughout a subsurface volume in a region of interest (e.g., near or encompassing a reservoir, near or encompassing a wellbore penetrating a reservoir). In many instances, subsurface properties of interest for reservoir characterization, well site planning, and production estimates cannot be directly measured. Or, at least, these properties cannot be directly measured throughout an entire subsurface volume with sufficient resolution (i.e., measurements may be discrete, coarsely spaced, and/or sparsely sampled). In other instances, subsurface properties may change with time, for example, as a well produces hydrocarbons from a reservoir.

Subsurface models may be used to inform a reservoir simulator that, among other things, models and predicts the production of one or more wells. Typically, it is desirable to predict the production and other behavior of a well and/or reservoir, even in the case when observed measurements are available, in order to optimally operate the well, manage the reservoir, and forecast future production. Accordingly, there exists a need to correct subsurface models or generate subsurface models that accurately represent a subsurface for use by reservoir simulators—and other characterization tools, production estimation methods, and simulations—given observed production measurements.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Embodiments disclosed herein generally relate to a method for generating history matched grid data. The method includes obtaining observed production data and obtaining latent grid data. The method further includes processing the observed production data to form observed latent production data and generating denoised latent grid data by removing noise from the latent grid data using a diffusion model guided by the observed latent production data and a time encoding. The method further includes generating history matched grid data by decoding the denoised latent grid data and optimizing production of a well using the history matched grid data.

Embodiments disclosed herein generally relate to a system that includes a first autoencoder including a first encoder and a first decoder and a second autoencoder including a second encoder and a second decoder. The system further includes a diffusion model and a time encoding that includes at least one time encoding vector. The system further includes a computer with one or more computer processors and a non-transitory computer-readable medium. The computer is configured to receive observed production data and obtain latent grid data. The computer is further configured to process the observed production data with the first encoder to form observed latent production data and generate denoised latent grid data by removing noise from the latent grid data using the diffusion model guided by the observed latent production data and the time encoding. The computer is further configured to generate history matched grid data by decoding the denoised latent grid data using the second decoder and optimize production of a well using the history matched grid data.

Embodiments disclosed herein generally relate to a non-transitory computer readable medium storing instructions executable by a computer processor. The instructions include functionality for receiving observed production data and obtaining latent grid data. The instructions further include functionality for processing the observed production data with a first encoder to form observed latent production data and generating denoised latent grid data by removing noise from the latent grid data using a diffusion model guided by the observed latent production data and a time encoding. The instructions further include functionality for generating history matched grid data by decoding the denoised latent grid data using a first decoder and optimizing production of a well using the history matched grid data.

Other aspects and advantages of the claimed subject matter will be apparent from the following description and the appended claims.

DETAILED DESCRIPTION

Figure 1:
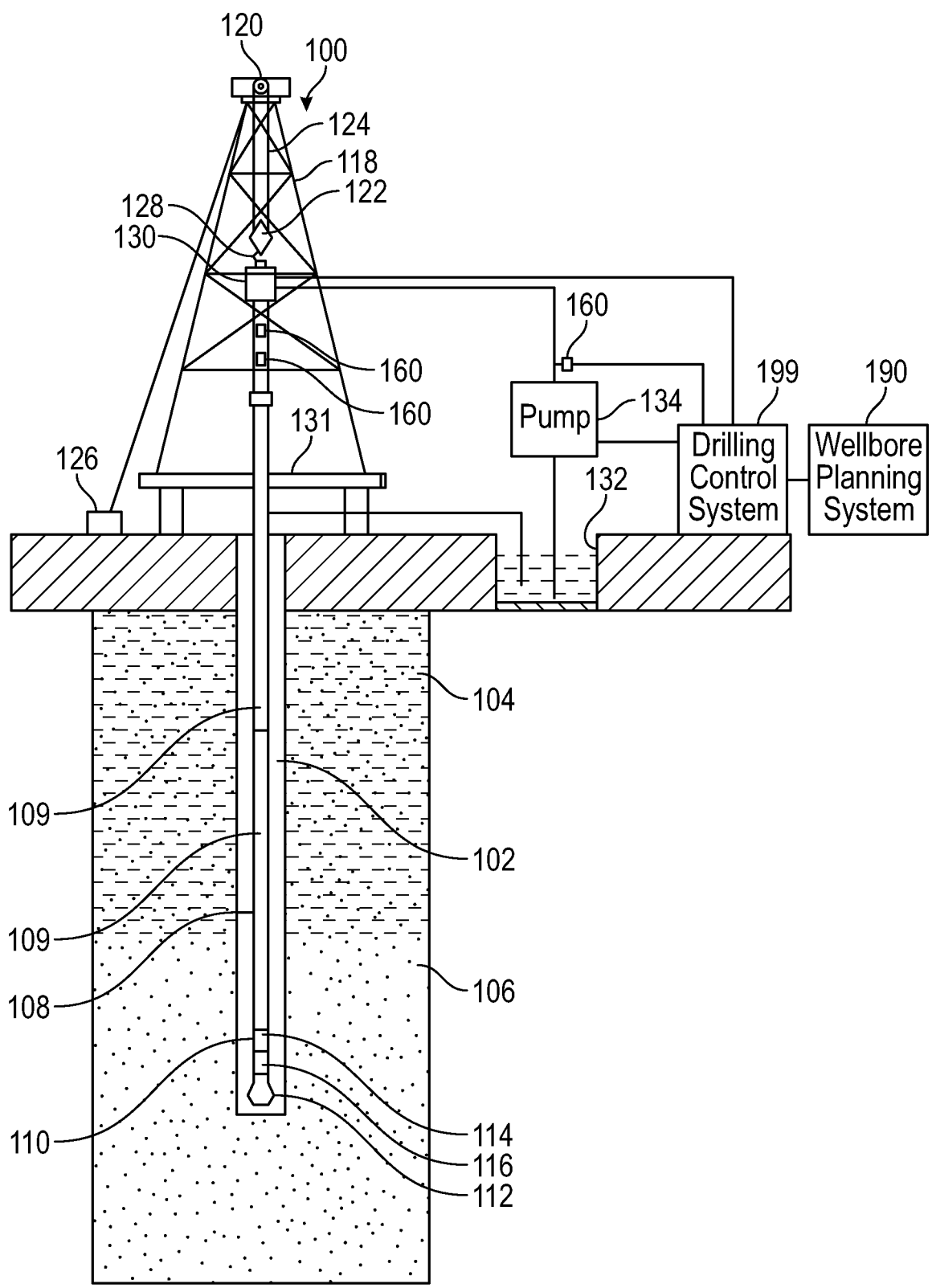
FIG. 1 depicts a well site in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowchart may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims.

In the following description of FIGS. 1-11, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Decisions regarding how best to produce oil and gas from one or more reservoirs and how to properly plan for future production, among other things, are dependent on accurate subsurface models. For example, one or more subsurface models may be used by reservoir simulator or other estimation method to forecast the production of a well and reservoir performance. Often, subsurface models that represent the spatial distribution of one or more properties of a subsurface (e.g., porosity, permeability, etc.) contain noise. For example, tools used to measure subsurface properties have an associated uncertainty such that obtained measurements can only be said to reside within a probabilistic range. Further, generally, measurements of subsurface properties are obtained at discrete spatial locations in the subsurface such that an approximation, such as interpolation, must be made to specify a property at any desired spatial location in the subsurface. Additionally, some subsurface properties may not be directly measured and instead may be approximated using inversion methods and/or are calculated using the values of other properties with a set of relating equations. Consequently, uncertainty with respect to the value of a subsurface property may propagate to another subsurface property. In other instances, a subsurface model may not be available and it may be desirable to construct a subsurface model given observed production data.

Generally, noise in subsurface models (or the complete lack of a subsurface model) may lead to discrepancies between the observed production and the predicted production of one or more existing and producing wells, where the predicted production is obtained using a reservoir simulator—or other production estimation method—informed by at least one subsurface model. These discrepancies may result in a reduction in confidence in the predictive capabilities of the reservoir simulator, prevent the optimal operation of one or more wells, and hinder or harm other operational activities associated with production forecasts (e.g., supply management, gas processing facilities, etc.). Embodiments disclosed herein relate to a machine-learned history matching system that identifies noise in one or more subsurface models, including subsurface models initially generated through a random process. The machine-learned history matching system operates to identify and remove noise from one or more subsurface models, even in the case when a subsurface model is originally generated through a random process, guided by observed production data. Thus, the machine-learned history matching system can be used to quickly (e.g., within seconds) produce geologically realistic subsurface models, and do so in an automated manner. In turn, the noise-corrected subsurface models may be used with one or more simulation techniques (e.g., reservoir simulator) to accurately predict quantities of interest (e.g., production forecasting, wellbore planning, etc.).

FIG. 1 depicts a simplified well site (100). In general, well sites may be configured in a myriad of ways. Therefore, the illustrated well site (100) of FIG. 1 is not intended to be limiting with respect to the particular configuration of the drilling equipment. The well site (100) is depicted as being on land. In other examples, the well site (100) may be offshore, and drilling may be carried out with or without use of a marine riser. A drilling operation at well site (100) may include drilling a wellbore (102) into a subsurface including various formations (104, 106). The wellbore (102) may include a bored hole that extends from the surface into a target zone of the subsurface formations (104, 106), such as a reservoir. The subsurface formations (104, 106) may be categorized by various formation properties of interest, such as formation porosity, formation permeability, resistivity, density, water saturation, total organic content and the like. Properties of the subsurface formations (104, 106) may vary spatially.

For the purpose of drilling a new section of wellbore (102), a drill string (108) is suspended within the wellbore (102). The drill string (108) may include one or more drill pipes (109) connected to form conduit and a bottom hole assembly (BHA) (110) disposed at the distal end of the conduit. The BHA (110) may include a drill bit (112) to cut into the subsurface rock. The BHA (110) may include measurement tools, such as a measurement-while-drilling (MWD) tool (114) and logging-while-drilling (LWD) tool (116). Measurement tools (114, 116) may include sensors and hardware to measure downhole drilling parameters, and these measurements may be transmitted to the surface using any suitable telemetry system known in the art. By means of example, a LWD tool (116) commonly collects information about the properties of the subsurface formations (104, 106). As previously described, these may include, but are not limited to, the density, the porosity, and the resistivity of the subsurface formations (104, 106). The BHA (110) and the drill string (108) may include other drilling tools known in the art but not specifically shown.

The drill string (108) may be suspended in a wellbore (102) by a derrick (118). A crown block (120) may be mounted at the top of the derrick (118), and a traveling block (122) may hang down from the crown block (120) by means of a cable or drilling line (124). One end of the cable (124) may be connected to a draw works (126), which is a reeling device that may be used to adjust the length of the cable (124) so that the traveling block (122) may move up or down the derrick (118). The traveling block (122) may include a hook (128) on which a top drive (130) is supported.

The top drive (130) is coupled to the top of the drill string (108) and is operable to rotate the drill string (108). Alternatively, the drill string (108) may be rotated by means of a rotary table (not shown) on the drilling floor (131). Drilling fluid (commonly called mud) may be stored in a mud pit (132), and at least one pump (134) may pump the mud from the mud pit (132) into the drill string (108). The mud may flow into the drill string (108) through appropriate flow paths in the top drive (130) (or a rotary swivel if a rotary table is used instead of a top drive to rotate the drill string (108)).

In one implementation, a drilling control system (199) may be disposed at or communicate with the well site (100). Drilling control system (199) may control at least a portion of a drilling operation at the well site (100) by providing controls to various components of the drilling operation. In one or more embodiments, the drilling control system (199) may receive data from one or more sensors (160) arranged to measure controllable parameters of the drilling operation. As a nonlimiting example, sensors (160) may be arranged to measure WOB (weight on bit), RPM (drill string rotational speed), GPM (flow rate of the mud pumps), and ROP (rate of penetration of the drilling operation).

Sensors (160) may be positioned to measure parameter(s) related to the rotation of the drill string (108), parameter(s) related to travel of the traveling block (122), which may be used to determine ROP of the drilling operation, and parameter(s) related to flow rate of the pump (134). For illustration purposes, sensors (160) are shown on drill string (108) and proximate mud pump (134). The illustrated locations of sensors (160) are not intended to be limiting, and sensors (160) could be disposed wherever drilling parameters need to be measured. Moreover, there may be many more sensors (160) than shown in FIG. 1 to measure various other parameters of the drilling operation. Each sensor (160) may be configured to measure a desired quantity.

During a drilling operation at the well site (100), the drill string (108) is rotated relative to the wellbore (102), and weight is applied to the drill bit (112) to enable the drill bit (112) to break rock as the drill string (108) is rotated. In some cases, the drill bit (112) may be rotated independently with a drilling motor (not shown). In other embodiments, the drill bit (112) may be rotated using a combination of the drilling motor and the top drive (130) (or a rotary swivel if a rotary table is used instead of a top drive to rotate the drill string (108)). While cutting rock with the drill bit (112), mud is pumped into the drill string (108).

The mud flows down the drill string (108) and exits into the bottom of the wellbore (102) through nozzles in the drill bit (112). The mud in the wellbore (102) then flows back up to the surface in an annular space between the drill string (108) and the wellbore (102) with entrained cuttings. The mud with the cuttings is returned to the mud pit (132) to be circulated back again into the drill string (108). Typically, the cuttings are removed from the mud, and the mud is reconditioned as necessary, before pumping the mud again into the drill string (108). In one or more embodiments, the drilling operation may be controlled by the drilling control system (199).

As noted, the well site (100) provides well logs either through measurement tools (114, 116) while drilling or by post-drilling surveys such as a wireline tool (not shown). Furthermore, data about the subsurface formations (104, 106) near a well site (100) may be obtained by analyzing the entrained cuttings, as a function to drilling depth, exiting the wellbore (102). In addition to data acquired at a well-site, other methods for collecting data and characterizing subsurface formations (104, 106) exist. For example, a seismic survey may be conducted.

Prior to the commencement of drilling, a wellbore plan may be generated. The wellbore plan may include a starting surface location of the wellbore (102), or a subsurface location within an existing wellbore (102), from which the wellbore (102) may be drilled. Further, the wellbore plan may include a terminal location that may intersect with a target zone (e.g., a hydrocarbon-bearing formation) and a planned wellbore path from the starting location to the terminal location. In other words, the wellbore path may intersect a previously located hydrocarbon reservoir.

Typically, the wellbore plan is generated based on best available information at the time of planning from subsurface models representing spatial property distributions, a geophysical model, geomechanical models encapsulating subterranean stress conditions, the trajectory of any existing wellbores (which it may be desirable to avoid), and the existence of other drilling hazards, such as shallow gas pockets, over-pressure zones, and active fault planes.

The wellbore plan may include wellbore geometry information such as wellbore diameter and inclination angle. If casing is used, the wellbore plan may include casing type or casing depths. Furthermore, the wellbore plan may consider other engineering constraints such as the maximum wellbore curvature ("dog-log") that the drill string (108) may tolerate and the maximum torque and drag values that the drilling system may tolerate.

A wellbore planning system (190) may be used to generate the wellbore plan. The wellbore planning system (190) may include one or more computer processors in communication with computer memory containing the subsurface, geophysical, and geomechanical models, information relating to drilling hazards, and the constraints imposed by the limitations of the drill string (108) and the drilling system. The wellbore planning system (190) may further include dedicated software to determine the planned wellbore path and associated drilling parameters, such as the planned wellbore diameter, the location of planned changes of the wellbore diameter, the planned depths at which casing will be inserted to support the wellbore (102) and to prevent formation fluids entering the wellbore, and the drilling mud weights (densities) and types that may be used during drilling the wellbore.

Figure 2:
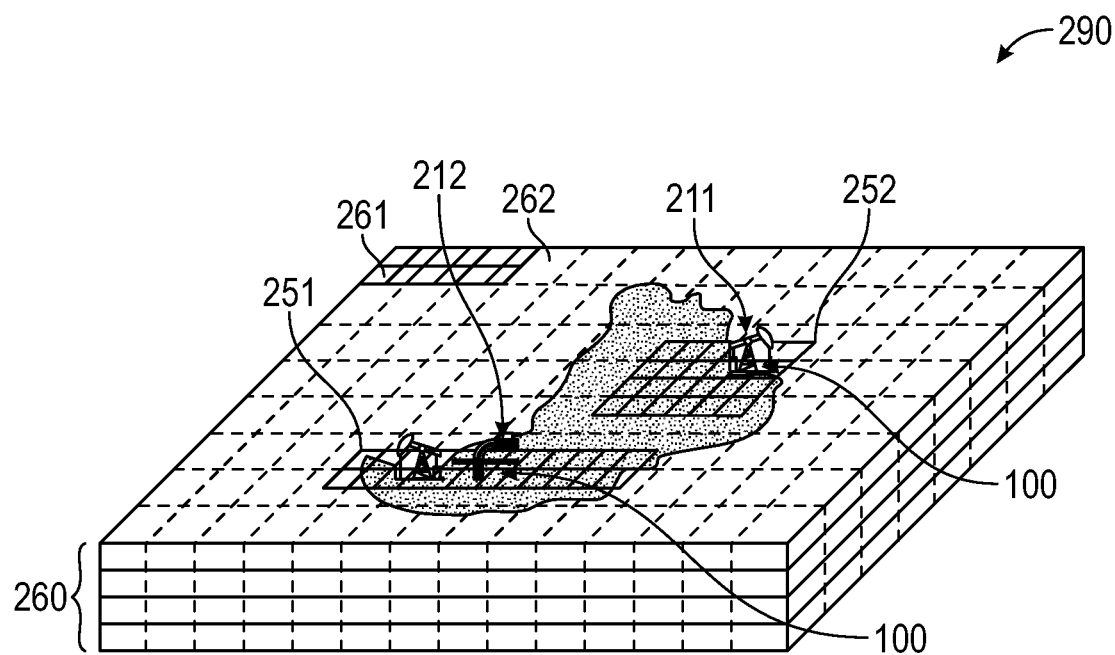
FIG. 2 depicts a reservoir simulation in accordance with one or more embodiments.

Turning to FIG. 2, FIG. 2 shows the basis of a reservoir simulator in accordance with one or more embodiments. FIG. 2 shows a reservoir grid model (290) that corresponds to a geological region. The geological region may span multiple well sites (100) and a subsurface region of interest. The well sites (100) may include injection wells (212), which inject a fluid into the local subsurface formations (104, 106), or an extraction well (211). More specifically, the reservoir grid model (290) includes grid cells (261) that may refer to an original cell of a reservoir grid model as well as coarse grid blocks (262) that may refer to an amalgamation of original cells of the reservoir grid model. For example, a grid cell may be the case of a 1×1 block, where coarse grid blocks may be of sizes 2×2, 4×4, 8×8, etc. Both the grid cells (261) and the coarse grid blocks (262) may correspond to columns for multiple model layers (260) within the reservoir grid model (290).

Prior to performing a reservoir simulation, local grid refinement and coarsening (LGR) may be used to increase or decrease grid resolution in a certain area of reservoir grid model (290). For example, various reservoir properties, e.g., permeability, porosity or saturations, may correspond to a discrete value that is associated with a particular grid cell or coarse grid block. However, by using discrete values to represent a portion of a geological region, a discretization error may occur in a reservoir simulation. Thus, finer grids may reduce discretization errors as the numerical approximation of a finer grid is closer to the exact solution, however through a higher computational cost. As shown in FIG. 2, for example, the reservoir grid model (290) may include various fine-grid models (i.e., fine-grid model A (251), fine-grid model B (252)), that are surrounded by coarse block regions. Likewise, the original reservoir grid model (290) without any coarsening may also be a fine-grid model. In some embodiments, a reservoir grid model (or multiple reservoir grid models) may be used to perform reservoir simulations.

Generally, reservoir simulators solve a set of mathematical governing equations that represent the physical laws that govern fluid flow in porous, permeable media. For example, the flow of a single-phase slightly compressible oil with a constant viscosity and compressibility, equations that capture Darcy's law, the continuity condition, and the equation of state and may be written as:

$$\nabla^2 p(x, t) = \frac{\psi \mu c_t}{k} \frac{\partial p(x, t)}{\partial t}, \quad (1)$$

where ρ represents fluid in the reservoir, x is a vector representing spatial position and t represents time. ψ, μ, $c_t$, and k represent the physical and petrophysical properties of porosity, fluid viscosity, total combined rock and fluid compressibility, and permeability, respectively. $\nabla^2$ represents the spatial Laplace operator.

Additional, and more complicated equations are required when more than one fluid, or more than one phase, e.g., liquid and gas, are present in the reservoir. Further, when the physical and petrophysical properties of the rocks and fluids vary as a function of position the governing equations may not be solved analytically and must instead be discretized into a grid of cells or blocks (as depicted in FIG. 2). The governing equations must then be solved by one of a variety of numerical methods, such as, without limitation, explicit or implicit finite-difference methods, explicit or implicit finite element methods, or discrete Galerkin methods.

In some embodiments, a reservoir simulator includes functionality for simulating the flow of fluids, including hydrocarbon fluids such as oil and gas, through a hydrocarbon reservoir composed of porous, permeable reservoir rocks in response to natural and anthropogenic pressure gradients. The reservoir simulator may be used to predict changes in fluid flow, including fluid flow into well penetrating the reservoir as a result of planned well drilling, and fluid injection and extraction. For example, the reservoir simulator may be used to predict changes in hydrocarbon production rate that would result from the injection of water into the reservoir from wells around the reservoir's periphery.

As stated, a reservoir simulator may account for, among other things, the porosity and hydrocarbon storage capacity of the subsurface formations (104, 106) and fluid transport pathways to predict the production rate of hydrocarbons of a well, or a set of wells, over their lifetime.

Under consideration of wellbore planning systems (190), reservoir simulators, and drilling operations, the need for accurate subsurface models is self-evident. Accurate subsurface models are important to reduce exploration risks, plan the location of well sites (100) (i.e., wellbore planning system (190)), optimize reservoir production, improve reservoir characterization, best leverage existing discoveries, and better extend hydrocarbon recovery from existing wells. Generally, a subsurface model contains a digital description of the physical properties of the rocks as a function of position within the subsurface region of interest and the fluids within the pores of the porous, permeable reservoir rocks at a given time. In some embodiments, the digital description may be in the form of a dense 3D grid with the physical properties of the rocks and fluids defined at each node. In some embodiments, the 3D grid may be a cartesian grid, while in other embodiments the grid may be an irregular grid. For example, subsurface models may indicate the porosity and permeability throughout a subsurface volume in a region of interest (e.g., near or encompassing a reservoir and/or wellbore). Hereafter, to promote generality, the term "grid data" will be adopted to refer to the digital representation of one or more subsurface properties (e.g., petrophysical, thermodynamic, etc.) for a subsurface region of interest, where no restriction is placed on the grid format (e.g., 3D, regular, cartesian).

The physical properties of the rocks and fluids within the reservoir may be obtained from a variety of geological and geophysical sources. For example, remote sensing geophysical surveys, such as seismic surveys, gravity surveys, and active and passive source resistivity surveys, may be employed. In addition, data collected such as well logs (from measurement tools (114, 116)) and production data acquired in wells penetrating the reservoir may be used to determine physical and petrophysical properties along the segment of the well trajectory traversing the reservoir. For example, porosity, permeability, density, seismic velocity, and resistivity may be measured along these segments of wellbore. Data collected from previously drilled, nearby wells, sometimes called "offset" wells, may also be appended to the collected data. Moreover, so-called "soft" data, such as outcrop information and data describing analogous modern geological or depositional environments may be integrated with the acquired well site (100) data and seismic data to further refine the modeled subsurface formations (104, 106). In accordance with some embodiments, remote sensing geophysical surveys and physical and petrophysical properties determined from well logs may be combined to estimate physical and petrophysical properties for the entire reservoir grid model (290).

While subsurface model data can originate from a variety of sources, the data is often limited to discrete, local locations (e.g., near the wellbore of an existing well) and does not provide sufficient resolution of a subsurface volume for use with a reservoir simulation, or other modeling effort. As such, in some instances, subsurface model data may serve as an initial estimate for subsurface properties. Further, in many instances, subsurface properties of interest for reservoir characterization and well site planning cannot be directly measured. In such a case, grid data may need to be determined (or generated in the context of the machine-learned history matching system) given observable quantities such as production data (e.g., flow rates, fluid pressures, etc.).

Figure 3:
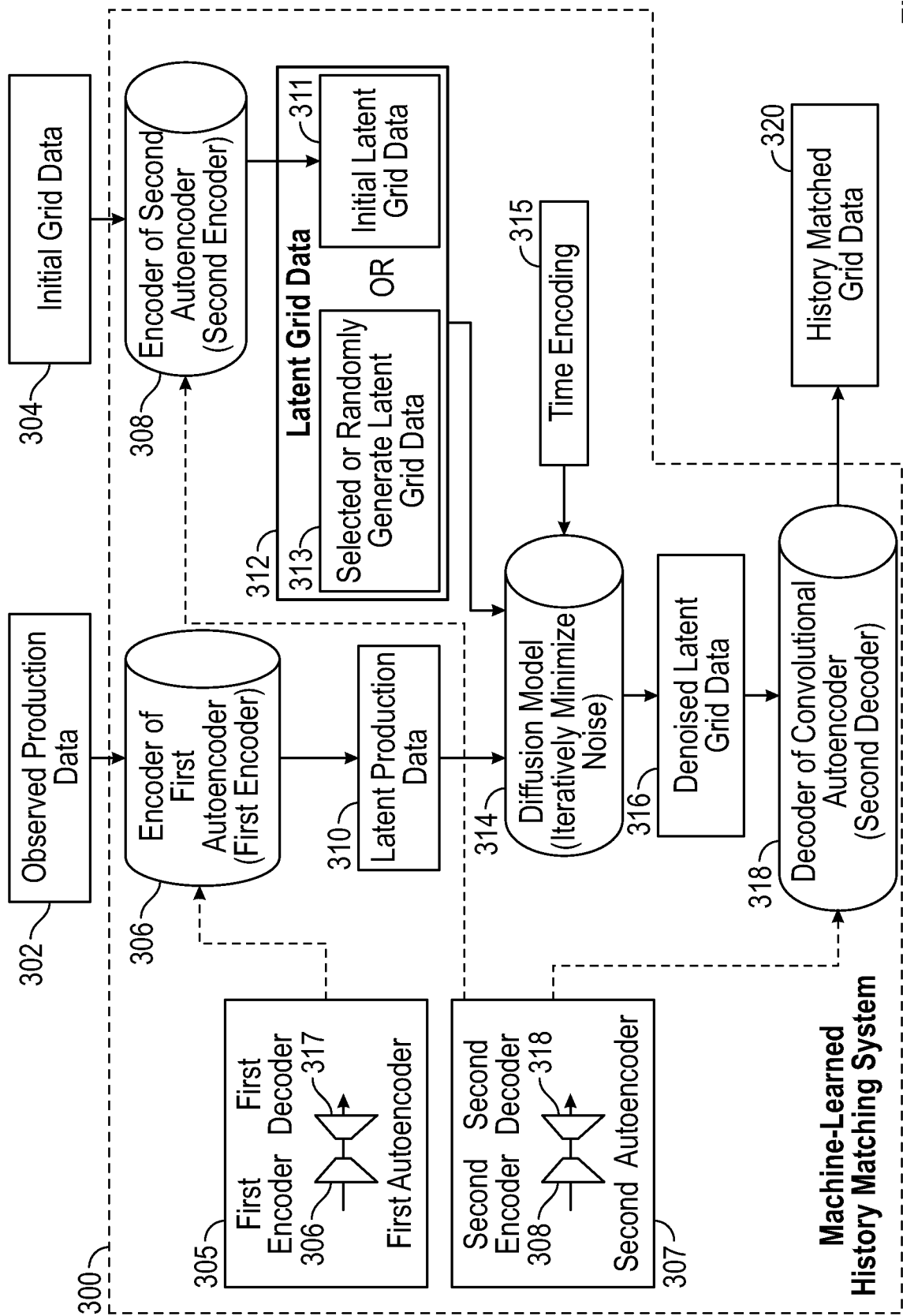
FIG. 3 depicts a system in accordance with one or more embodiments.

FIG. 3 depicts a high-level overview of the machine-learned history matching system (300), in accordance with one or more embodiments. As will be seen, the machine-learned history matching system (300) includes various machine learning models. General concepts involving machine learning and an introduction to various machine learning model types are provided later in the instant disclosure. However, in the context of FIG. 3, it is noted that all indicated machine-learned models are considered to be "trained," or pre-configured to operate as depicted. That is, the machine-learned models are configured to accept, process, and output data as depicted in FIG. 3 where each model is configured by an associated set of trained, or previously learned, parameters. Again, the concept of training a machine-learned model will be discussed later in the instant disclosure.

As seen in FIG. 3, in one or more embodiments, the machine-learned history matching system (300) is configured to accept observed production data (302). The observed production data (302) may include a history of measured production values in time (e.g., a time series). Measured production values may include the amount of hydrocarbons and other byproducts (e.g., formation brine) produced from a well over a given time period (e.g., oil production per day), fluid flow rates (which may be multiphase), and fluid pressures. In one or more embodiments, the machine-learned history matching system (300) may further receive initial grid data (304), although as it will be shown, receiving initial grid data (304) is not a requirement. Initial grid data (304) may be a coarse or initial estimate of one or more subsurface properties for a region of interest.

Continuing with FIG. 3, as seen, the machine-learned simulator history matching system (300) includes a first autoencoder (305) and a second autoencoder (307). Autoencoders may be considered a type of machine-learned model. As previously stated, more information regarding machine learning and machine-learned models such as autoencoders is provided later in the instant disclosure. For now, it is sufficient to say that an autoencoder is composed of an encoder and a decoder. In general, the encoder receives data and produces a compressed (i.e., lower computational memory requirement) representation of the received data. Often, in the literature, the compressed representation may be said to exist in a "latent" space. The latent space is simply a representation of compressed data in which similar data points are intended to be closer together, according to some spatial distance metric. The purpose of the decoder is to restore a compressed data representation (i.e., a data point in latent space) to its original state (i.e., the data as originally received by the encoder). In FIG. 3, the first autoencoder (305) includes a first encoder (306) and a first decoder (317). Likewise, the second autoencoder (307) includes a second encoder (308) and a second decoder (318).

As depicted in FIG. 3, the first encoder (306), or the encoder of the first autoencoder (305), processes the observed production data (302) to form latent production data (310). That is, the latent production data (310) is a compressed representation of the observed production data (302). Similarly, the second encoder (308), or the encoder of the second autoencoder (307), processes the initial grid data (304), if provided, to form initial latent grid data (311), where the initial latent grid data (311) is a compressed representation of the initial grid data (304). In instances where initial grid data (304) is not provided, latent grid data may be formed directly in the latent space. Latent grid data can be formed through a random generation process or can be selected from a previously seen and encoded set of grid data (e.g., a set of grid data processed by the second encoder (308) and used to train the machine-learned history matching system (300)). Herein, when initial grid data (304) is not received, selected or randomly generated latent grid data (313) is used in the machine-learned history matching system (300). To simplify discussion, the term latent grid data (312) is used herein to generalize both the selected or randomly generated latent grid data (313) and the initial latent grid data (311); further, context will distinguish if the latent grid data is "initial" or "selected or generated" as needed.

In accordance with one or more embodiments, as part of the machine-learned simulator history matching system (300), the latent production data (310) and the latent grid data (312) are passed to and used by a diffusion model (314). A diffusion model may be considered another type of machine learning model and is discussed in greater detail later in the instant disclosure. Again, for now, is sufficient to state that the diffusion model (314) iteratively identifies and removes noise from the latent grid data (312) until eventually outputting a denoised version of the latent grid data aptly depicted as denoised latent grid data (316) in FIG. 3. However, it is noted that at each iteration (or timestep), the diffusion model (314) receives a time encoding vector that alters the behavior of the diffusion model (314). The time encoding vector indicates, at least generally, the amount of noise that should be removed from the latent grid data at a given iteration. As such, a time encoding vector exists for each iteration (i.e., timestep) and the time encoding vectors (at least one) are included in the "time encoding" (315). FIG. 3 depicts the diffusion model (314) receiving the time encoding (315). More information regarding the time encoding (315) and how it is constructed is provided later in the instant disclosure.

In one or more embodiments, the second decoder (318), or the decoder of the second autoencoder (307), is used to decompress the denoised latent grid data (316) resulting in a denoised version depicted in FIG. 3 as history matched grid data (320). The term "history matched" is used to indicate that the history matched grid data (320) was determined using, at least in part, observed (or historical) production data (302). In one or more embodiments, when the history matched grid data (320) is used with a reservoir simulator, production data predicted by the reservoir simulator matches the observed production data (302). Thus, a reservoir simulator informed by the history matched grid data (320) will produce highly accurate production predictions, and other predicted quantities, resulting in the improvement of production forecasts, the optimization of well operation, and tailored, data-driven management decisions. In summary, the machine-learned history matching system (300) constructs one or more geologically realistic subsurface models (i.e., history matched grid data) informed by observed production data.

As depicted in FIG. 3, the machine-learned simulator history matching system (300) contains or makes us of various machine-learned models. Machine learning (ML), broadly defined, is the extraction of patterns and insights from data. The phrases "artificial intelligence", "machine learning", "deep learning", and "pattern recognition" are often convoluted, interchanged, and used synonymously throughout the literature. This ambiguity arises because the field of "extracting patterns and insights from data" was developed simultaneously and disjointedly among a number of classical arts like mathematics, statistics, and computer science. For consistency, the term machine learning, or machine-learned, will be adopted herein. However, one skilled in the art will recognize that the concepts and methods detailed hereafter are not limited by this choice of nomenclature.

Machine-learned model types may include, but are not limited to, generalized linear models, Bayesian regression, random forests, and deep models such as neural networks, convolutional neural networks, and recurrent neural networks. Machine-learned model types, whether they are considered deep or not, are usually associated with additional "hyperparameters" which further describe the model. For example, hyperparameters providing further detail about a neural network may include, but are not limited to, the number of layers in the neural network, choice of activation functions, inclusion of batch normalization layers, and regularization strength. Hyperparameters governing an autoencoder may include the compression ratio, or otherwise state the amount of compression performed on received data by the encoder. Commonly, in the literature, the selection of hyperparameters surrounding a machine-learned model is referred to as selecting the model "architecture." Once a machine-learned model type and hyperparameters have been selected, the machine-learned model is trained to perform a task. In accordance with one or more embodiments, a first autoencoder (305), a second autoencoder (307), and a diffusion model (314), each with selected hyperparameters, are trained for use in the machine-learned simulator history matching system (300) to remove noise from grid data in a manner that matches production history. Once these models are trained, they may be used in a production setting (also known as deployment of the machine-learned model) as depicted in FIG. 3.

Herein, a cursory introduction to various machine-learned models such as a neural network (NN) and convolutional neural network (CNN) are provided as these models are often used as components—or may be adapted and/or built upon—to form more complex models such as autoencoders and diffusion models. However, it is noted that many variations of neural networks, convolutional neural networks, autoencoders, transformers, and diffusion models exist. Therefore, one with ordinary skill in the art will recognize that any variations to the machine-learned models of the machine-learned simulator history matching system (300) that differ from the introductory models discussed herein may be employed without departing from the scope of this disclosure. Further, it is emphasized that the following discussions of machine-learned models are basic summaries and should not be considered limiting.

Figure 4:
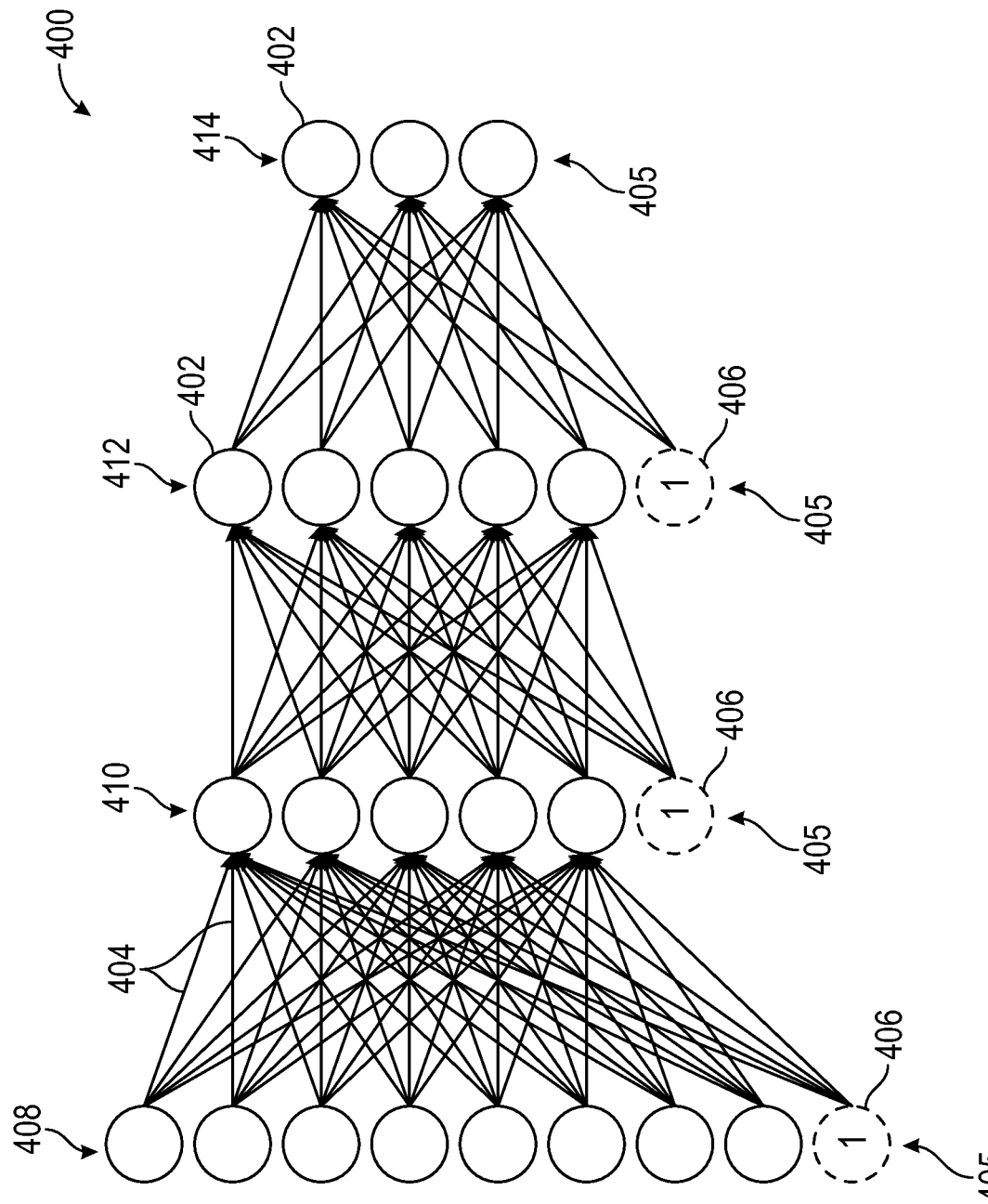
FIG. 4 depicts a neural network in accordance with one or more embodiments.

A diagram of a neural network is shown in FIG. 4. At a high level, a neural network (400) may be graphically depicted as being composed of nodes (402), where here any circle represents a node, and edges (404), shown here as directed lines. The nodes (402) may be grouped to form layers (405). FIG. 4 displays four layers (408, 410, 412, 414) of nodes (402) where the nodes (402) are grouped into columns, however, the grouping need not be as shown in FIG. 4. The edges (404) connect the nodes (402). Edges (404) may connect, or not connect, to any node(s) (402) regardless of which layer (405) the node(s) (402) is in. That is, the nodes (402) may be sparsely and residually connected. A neural network (400) will have at least two layers (405), where the first layer (408) is considered the "input layer" and the last layer (414) is the "output layer." Any intermediate layer (410, 412) is usually described as a "hidden layer." A neural network (400) may have zero or more hidden layers (410, 412) and a neural network (400) with at least one hidden layer (410, 412) may be described as a "deep" neural network or as a "deep learning method." In general, a neural network (400) may have more than one node (402) in the output layer (414). In this case the neural network (400) may be referred to as a "multi-target" or "multi-output" network.

Nodes (402) and edges (404) carry additional associations. Namely, every edge is associated with a numerical value. The edge numerical values, or even the edges (404) themselves, are often referred to as "weights" or "parameters." While training a neural network (400), numerical values are assigned to each edge (404). Additionally, every node (402) is associated with a numerical variable and an activation function. Activation functions are not limited to any functional class, but traditionally follow the form $$A = f\left(\sum_{i \in (incoming)} [(\text{node value})_i (\text{edge value})_i]\right), \quad (2)$$

where i is an index that spans the set of "incoming" nodes (402) and edges (404) and f is a user-defined function. Incoming nodes (402) are those that, when viewed as a graph (as in FIG. 4), have directed arrows that point to the node (402) where the numerical value is being computed. Some functions for f may include the linear function $f(x)=x$, sigmoid function $$f(x) = \frac{1}{1 + e^{-x}},$$

and rectified linear unit function $f(x)=\max(0, x)$, however many additional functions are commonly employed. Every node (402) in a neural network (400) may have a different associated activation function. Often, as a shorthand, activation functions are described by the function f by which it is composed. That is, an activation function composed of a linear function f may simply be referred to as a linear activation function without undue ambiguity.

When the neural network (400) receives an input, the input is propagated through the network according to the activation functions and incoming node (402) values and edge (404) values to compute a value for each node (402). That is, the numerical value for each node (402) may change for each received input. Occasionally, nodes (402) are assigned fixed numerical values, such as the value of 1, that are not affected by the input or altered according to edge (404) values and activation functions. Fixed nodes (402) are often referred to as "biases" or "bias nodes" (406), displayed in FIG. 4 with a dashed circle.

In some implementations, the neural network (400) may contain specialized layers (405), such as a normalization layer, or additional connection procedures, like concatenation. One skilled in the art will appreciate that these alterations do not exceed the scope of this disclosure.

As noted, the training procedure for the neural network (400) comprises assigning values to the edges (404). To begin training the edges (404) are assigned initial values. These values may be assigned randomly, assigned according to a prescribed distribution, assigned manually, or by some other assignment mechanism. Once edge (404) values have been initialized, the neural network (400) may act as a function, such that it may receive inputs and produce an output. As such, at least one input is propagated through the neural network (400) to produce an output. Training data is provided to the neural network (400). Generally, training data consists of pairs of inputs and associated targets. The targets represent the "ground truth," or the otherwise desired output, upon processing the inputs. During training, the neural network (400) processes at least one input from the training data and produces at least one output. Each neural network (400) output is compared to its associated input data target. The comparison of the neural network (400) output to the target is typically performed by a so-called "loss function;" although other names for this comparison function such as "error function," "misfit function," and "cost function" are commonly employed. Many types of loss functions are available, such as the mean-squared-error function, however, the general characteristic of a loss function is that the loss function provides a numerical evaluation of the similarity between the neural network (400) output and the associated target. The loss function may also be constructed to impose additional constraints on the values assumed by the edges (404), for example, by adding a penalty term, which may be physics-based, or a regularization term. Generally, the goal of a training procedure is to alter the edge (404) values to promote similarity between the neural network (400) output and associated target over the training data. Thus, the loss function is used to guide changes made to the edge (404) values, typically through a process called "backpropagation."

While a full review of the backpropagation process exceeds the scope of this disclosure, a brief summary is provided. Backpropagation consists of computing the gradient of the loss function over the edge (404) values. The gradient indicates the direction of change in the edge (404) values that results in the greatest change to the loss function. Because the gradient is local to the current edge (404) values, the edge (404) values are typically updated by a "step" in the direction indicated by the gradient. The step size is often referred to as the "learning rate" and need not remain fixed during the training process. Additionally, the step size and direction may be informed by previously seen edge (404) values or previously computed gradients. Such methods for determining the step direction are usually referred to as "momentum" based methods.

Once the edge (404) values have been updated, or altered from their initial values, through a backpropagation step, the neural network (400) will likely produce different outputs. Thus, the procedure of propagating at least one input through the neural network (400), comparing the neural network (400) output with the associated target with a loss function, computing the gradient of the loss function with respect to the edge (404) values, and updating the edge (404) values with a step guided by the gradient, is repeated until a termination criterion is reached. Common termination criteria are: reaching a fixed number of edge (404) updates, otherwise known as an iteration counter; a diminishing learning rate; noting no appreciable change in the loss function between iterations; reaching a specified performance metric as evaluated on the data or a separate hold-out data set. Once the termination criterion is satisfied, and the edge (404) values are no longer intended to be altered, the neural network (400) is said to be "trained."

A CNN is similar to a neural network (400) in that it can technically be graphically represented by a series of edges (404) and nodes (402) grouped to form layers. However, it is more informative to view a CNN as structural groupings of weights; where here the term structural indicates that the weights within a group have a relationship. CNNs are widely applied when the data inputs also have a structural relationship, for example, a spatial relationship where one input is always considered "to the left" of another input. Grid data, which may be three-dimensional, has such a structural relationship because each data element, or grid point, in the grid data has a spatial location (and sometimes also a temporal location when grid data is allowed to change with time). Consequently, a CNN is an intuitive choice for processing grid data.

A structural grouping, or group, of weights is herein referred to as a "filter". The number of weights in a filter is typically much less than the number of inputs, where here the number of inputs refers to the number of data elements or grid points in a set of grid data. In a CNN, the filters can be thought as "sliding" over, or convolving with, the inputs to form an intermediate output or intermediate representation of the inputs which still possesses a structural relationship. Like unto the neural network (400), the intermediate outputs are often further processed with an activation function. Many filters may be applied to the inputs to form many intermediate representations. Additional filters may be formed to operate on the intermediate representations creating more intermediate representations. This process may be repeated as prescribed by a user. There is a "final" group of intermediate representations, wherein no more filters act on these intermediate representations. In some instances, the structural relationship of the final intermediate representations is ablated; a process known as "flattening." The flattened representation may be passed to a neural network (400) to produce a final output. Note, that in this context, the neural network (400) is still considered part of the CNN. Like unto a neural network (400), a CNN is trained, after initialization of the filter weights, and the edge (404) values of the internal neural network (400), if present, with the backpropagation process in accordance with a loss function.

A common architecture for CNNs is the so-called "U-net." The term U-net is derived because a CNN after this architecture is composed of an encoder branch and a decoder branch that, when depicted graphically, often form the shape of the letter "U." Generally, in a U-net type CNN the encoder branch is composed of N encoder blocks and the decoder branch is composed of N decoder blocks, where $N \geq 1$. The value of N may be considered a hyperparameter that can be prescribed by user or learned (or tuned) during a training and validation procedure. Typically, each encoder block and each decoder block consist of a convolutional operation, followed by an activation function and the application of a pooling (i.e., downsampling) or upsampling operation. Further, in a U-net type CNN each of the N encoder and decoder blocks may be said to form a pair. Intermediate data representations output by an encoder block may be passed to, and often concatenated with other data, an associated (i.e., paired) decoder block through a "skip" connection or "residual" connection.

Another type of machine-learned model is a transformer. A detailed description of a transformer exceeds the scope of this disclosure. However, in summary, a transformer may be said to be deep neural network capable of learning context among data features. Generally, transformers act on sequential data (such as a sentence where the words form an ordered sequence). Transformers often determine or track the relative importance of features in input and output (or target) data through a mechanism known as "attention." In some instances, attention mechanism may further be specified as "self-attention" and "cross-attention," where self-attention determines the importance of features of a data set (e.g., input data, intermediate data) relative to other features of the data set. For example, if the data set is formatted as a vector with M elements, then self-attention quantifies a relationship between the M elements. In contrast, cross-attention determines the relative importance of features to each other between two data sets (e.g., an input vector and an output vector). Although transformers generally operate on sequential data composed of ordered elements, transformers do not process the elements of the data sequentially (such as in a recurrent neural network) and require an additional mechanism to capture the order, or relative positions, of data elements in a given sequence. Thus, transformers often use a positional encoder to describe the position of each data element in a sequence, where the positional encoder assigns a unique identifier to each position. A positional encoder may be used to describe a temporal relationship between data elements (i.e., time series) or between iterations of a data set when a data set is processed iteratively (i.e., representations of a data set at different iterations). While concepts such as attention and positional encoding were generally developed in the context of a transformer, they may be readily inserted into—and used with—other types of machine-learned models (e.g., diffusion models).

Figure 5:
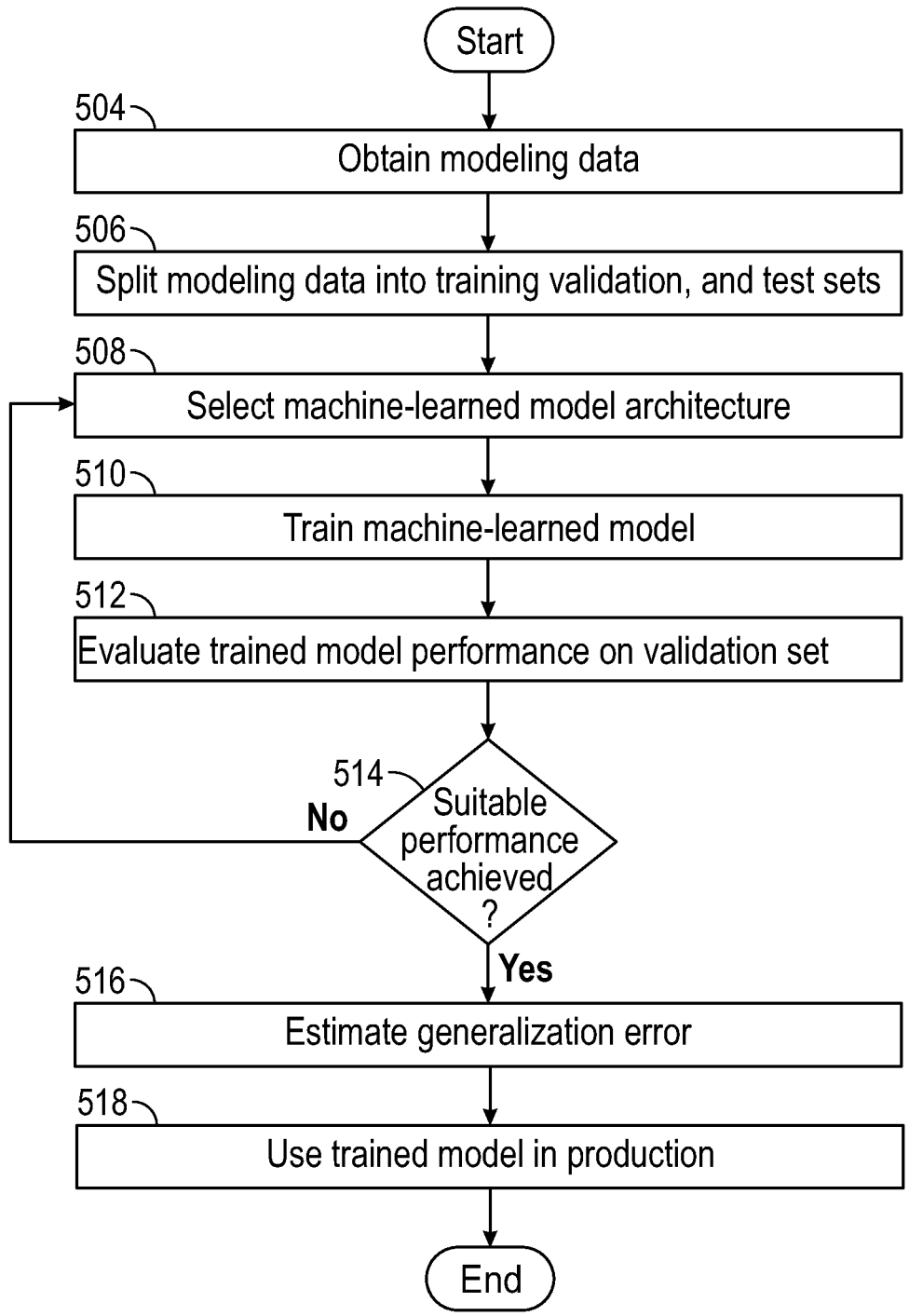
FIG. 5 depicts a flowchart in accordance with one or more embodiments.

FIG. 5 depicts a general framework for training and evaluating a machine-learned model. Herein, when training a machine-learned model, the more general term "modeling data" will be adopted as opposed to training data to refer to data used for training, evaluating, and testing a machine-learned model. Further, use of the term modeling data prevents ambiguity when discussing various partitions of modeling data such as a training set, validation set, and test set, described below. In the context of FIG. 5, modeling data will be said to consist of pairs of inputs and associated targets. When a machine-learned model is trained using pairs of inputs and associated targets, that machine-learned model is typically categorized as a "supervised" machine-learned model or a supervised method. In the literature, autoencoders are often categorized as "unsupervised" or "semi-supervised" machine learning models because modeling data used to train these models does not include distinct targets. For example, in the case of autoencoders, the output, and thus the desired target, of an autoencoder is the input. That said, while autoencoders may not be considered supervised models, the training procedure depicted in FIG. 5 may still be applied to train autoencoders where it is understood that an input-target pair is formed by setting the target equal to the input.

To train a machine-learned model (e.g., diffusion model (314)), modeling data must be provided. In accordance with one or more embodiments, modeling data may be collected from existing wells and reservoirs with known grid data and associated production data. In one or more embodiments, modeling data is synthetically generated, for example, by artificially constructing grid data and determining the production of one or more wells using a reservoir simulator that uses the artificially constructed grid data. In one or more embodiments, grid data is artificially constructed through perturbations of "real" grid data (i.e., grid data acquired from a well site using measurement and/or survey tools). In one or more embodiments, the perturbations are governed through a set of perturbation parameters, where the values of the perturbation parameters are determined based on the real grid data. For example, in one or more embodiments, the values of the perturbation parameters are prescribed using statistical descriptions of the real grid data. In this manner, the synthetic modeling data may be said to be informed by a prior, or prior information, derived from the real data. It is noted that it is desirable that the modeling data include a wide variety of data instances pertaining to different geological regions and production characteristics. This is to promote robustness in the machine-learned history matching system (300) such that it is generalizable to new wells and input data unseen during training and evaluation.

Keeping with FIG. 5, in Block 504, modeling data is obtained. As stated, the modeling data may be acquired from historical datasets, be synthetically generated, or may be a combination of real and synthetic data. In Block 506, the modeling data is split into a training set, validation set, and test set. In one or more embodiments, the validation and the test set are the same such that the modeling data is effectively split into a training set and a validation/testing set. In Block 508, given the machine-learned model type (e.g., autoencoder) an architecture (e.g., number of layers, compression ratio, etc.) are selected. In accordance with one or more embodiments, architecture selection is performed by cycling through a set of user-defined architectures for a given model type. In other embodiments, the architecture is selected based on the performance of previously evaluated models with their associated architectures, for example, using a Bayesian-based search. In Block 510, with an architecture selected, the machine-learned model is trained using the training set. During training, the machine-learned model is adjusted such that the output of the machine-learned model, upon receiving an input, is similar to the associated target (or, in the case of an autoencoder, the input). Once the machine-learned model is trained, in Block 512, the validation set is processed by the trained machine-learned model and its outputs are compared to the associated targets. Thus, the performance of the trained machine-learned model can be evaluated. Block 514 represents a decision. If the trained machine-learned model is found to have suitable performance as evaluated on the validation set, where the criterion for suitable performance is defined by a user, then the trained machine-learned model is accepted for use in a production (or deployed) setting. As such, in Block 518, the trained machine-learned model is used in production. However, before the machine-learned model is used in production a final indication of its performance can be acquired by estimating the generalization error of the trained machine-learned model, as shown in Block 516. The generalization error is estimated by evaluating the performance of the trained machine-learned model, after a suitable model has been found, on the test set. One with ordinary skill in the art will recognize that the training procedure depicted in FIG. 5 is general and that many adaptions can be made without departing from the scope of the present disclosure. For example, common training techniques, such as early stopping, adaptive or scheduled learning rates, and cross-validation may be used during training without departing from the scope of this disclosure.

Figure 6:
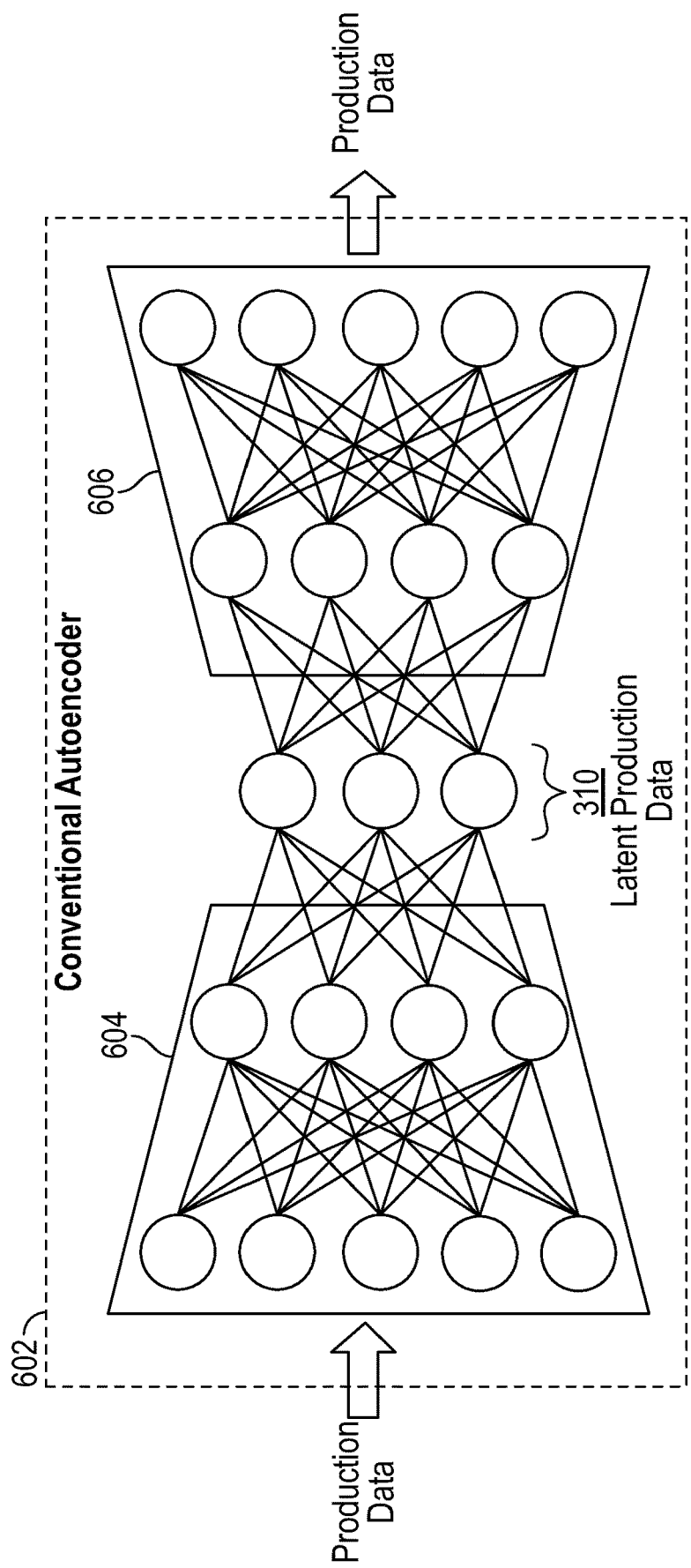
FIG. 6 depicts a conventional autoencoder in accordance with one or more embodiments.

In accordance with one or more embodiments, the first autoencoder (305) of the machine-learned history matching system (300) is a conventional autoencoder (602) as depicted in FIG. 6. The conventional autoencoder includes a conventional encoder (604) and a conventional decoder (606) each composed of a fully connected (or densely connected) neural network. As seen in FIG. 6, the conventional autoencoder (602) is configured to receive production data. Production data received by the conventional autoencoder (602) is processed by the conventional encoder (604) to form a compressed representation of the production data (i.e., latent production data (310)). If desired, the latent production data (310) can be restored to a form approximating the originally received production data using the conventional decoder (606).

Figure 7:
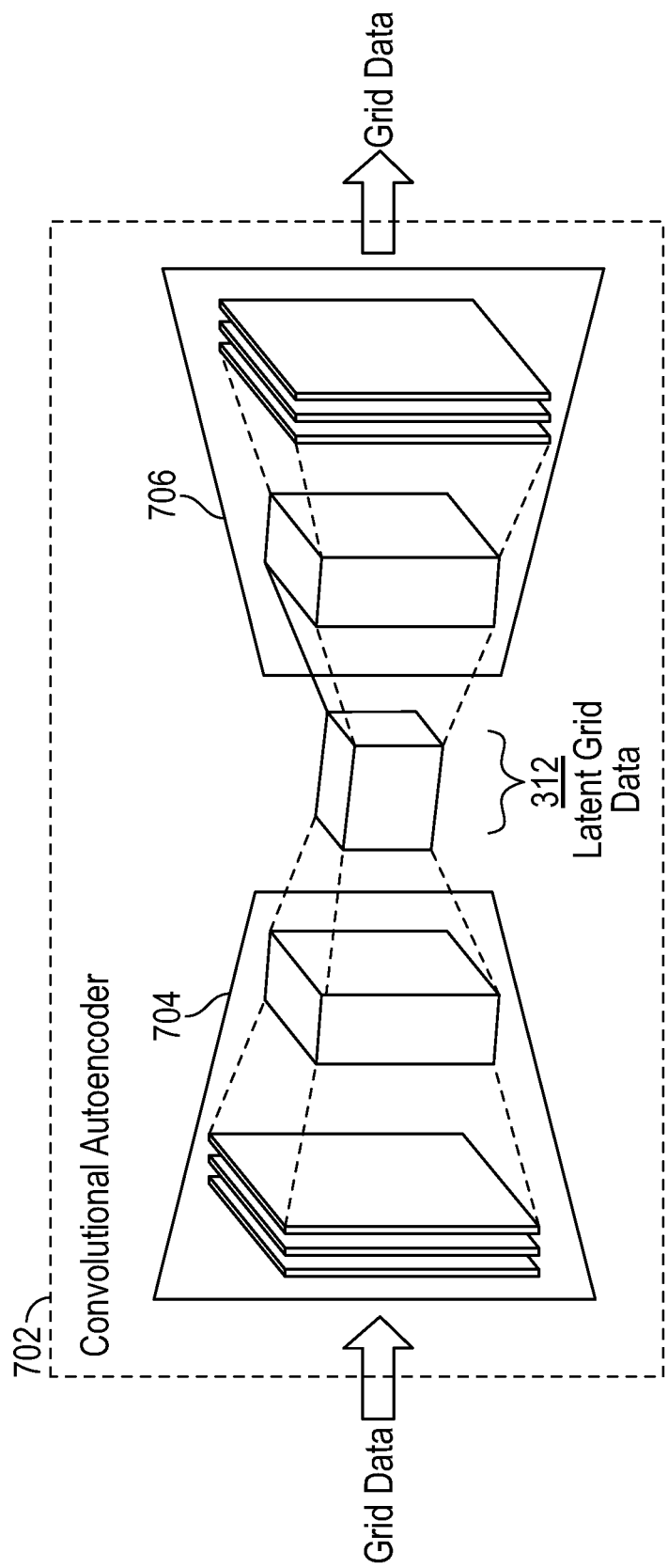
FIG. 7 depicts a convolutional autoencoder in accordance with one or more embodiments.

In accordance with one or more embodiments, the second autoencoder (307) of the machine-learned history matching system (300) is a convolutional autoencoder (702) as depicted in FIG. 7. The convolutional autoencoder includes a convolutional encoder (704) and a convolutional decoder (706) each composed of a convolutional neural network (CNN) or at least one convolutional filter or convolutional block. As seen in FIG. 7, the convolutional autoencoder (702) is configured to receive grid data. Grid data received by the convolutional autoencoder (702) is processed by the convolutional encoder (704) to form a compressed representation of the grid data (i.e., latent grid data (312)). Upon removal of noise using the diffusion model (314), the latent grid data (312) can be restored to the uncompressed space ("real" space) using the convolutional decoder (706) resulting in history matched grid data (320).

As previously discussed, a diffusion model (314) within the machine-learned history matching system (300) operates to denoise latent grid data (312). Diffusion models are probabilistic and generative models designed to learn a data distribution by gradually denoising a variable (e.g., latent grid data). As such, diffusion models may be interpreted as a sequence of denoising autoencoders. Diffusion models generally exhibit a mode-covering behavior which allows for greater model capacity (or the ability of the model to learn a complex pattern) but at increased computational cost. To reduce the computational cost associated with training the diffusion model (314), the diffusion model (314) of the machine-learned history matching system (300) is trained using—and operates on—compressed data (e.g., latent grid data (312), latent production data (310)), in accordance with one or more embodiments. In one or more embodiments, a hyperparameter of the diffusion model (314), which may be specified by a user or learned during a training and evaluation process, is the number of timesteps (or iterations) of noise removal. In one or more embodiments, the amount of noise removal is configured to be greater in the first few time steps and then gradually decrease until zero or relatively little noise is removed on the last time step. In accordance with one or more embodiments, a sampler or sampling method is used to create the timesteps that are then encoded using positional encoding to produce a time encoding vector for each timestep that can be embedded into the diffusion model (314). In one or more embodiments, the sampling method is kernel least-mean square (KLMS) sampling. The time encoding vectors (at least one) are stored or otherwise contained in the time encoding (315).

Figure 8:
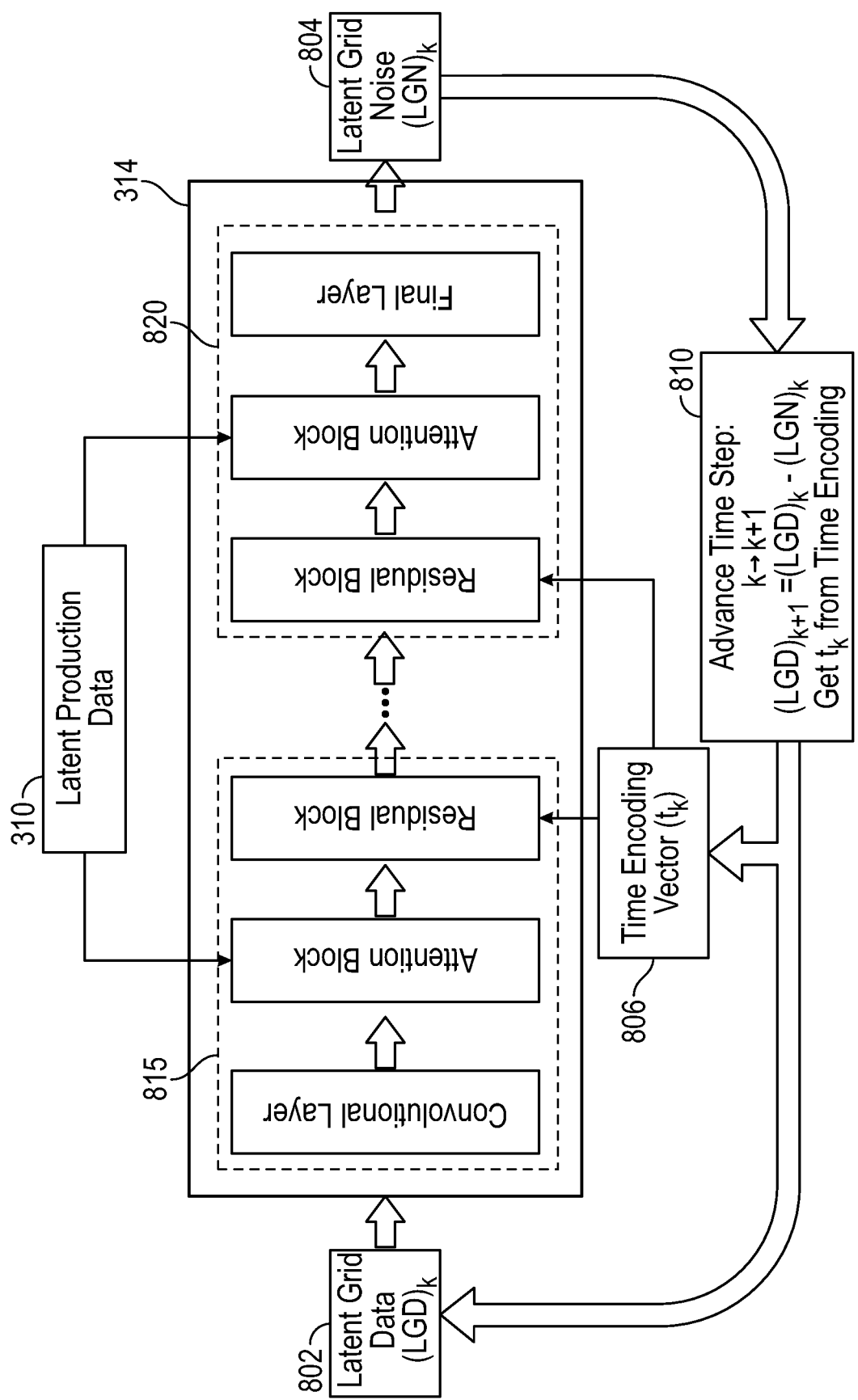
FIG. 8 depicts a diffusion model in accordance with one or more embodiments.

In accordance with one or more embodiments, FIG. 8 provides a graphical depiction of the diffusion model (314) used by the machine-learned history matching system (300). As stated, the diffusion model (314) operates iteratively according to a pre-defined number of timesteps. Herein, the total number of timesteps is specified as K. At each iteration, the diffusion model (314) receives latent grid data and outputs identified noise to be removed from the latent grid data. Herein, the identified noise to be removed is referred to as latent grid noise. To promote generalization, the depiction in FIG. 8 adopts an index, k, to indicate the $k^{th}$ iteration, where $1 \leq k \leq K$. Thus, for the $k^{th}$ iteration, the diffusion model (314) receives the $k^{th}$ version of the latent grid data, $(LGD)_k$. It is noted that $(LGD)_1$ corresponds to either the initial latent grid data (311) directly generated using the second encoder (308) from initial grid data (304) (which may approximate the properties of a subsurface) or grid data randomly generated in the latent space or otherwise selected from a set of previously encoded grid data. That is, the latent grid data to be denoised by the diffusion model (314) may be informed by prior information related to a subsurface or may be random (giving the diffusion model (314) its generative property). Upon processing the $k^{th}$ version of the latent grid data, $(LGD)_k$, the diffusion model (314) outputs the identified noise for $(LGD)_k$ referred to herein as the $k^{th}$ latent grid noise, $(LGN)_k$. To advance a timestep, using the notation of FIG. 8, the index k is incremented by a value of 1 and the $(k+1)^{th}$ version of the latent grid data, $(LGD)_{k+1}$, is determined by removing the noise $(LGN)_k$ from the $k^{th}$ version of the latent grid data, $(LGD)_k$, as depicted in Block 810.

Continuing with FIG. 8, in one or more embodiments, the diffusion model (314) itself is composed of a series of D diffusion blocks (815) where a diffusion block (815) is typically composed of a convolutional layer (or block), an attention block, and a residual block. In general, the value of D is a hyperparameter that partially specifies the architecture of the diffusion model (314) and may be defined by a user or learned during a training and evaluation process. Further, without loss of generality, the diffusion model (314) may be structured in a variety of ways including, but not limited to: connecting one or more diffusion blocks, or parts of the diffusion blocks, with skip connections; organizing one or more diffusion blocks to form a U-net style network; and specifying or learning the kernel size of convolutional operations. In one or more embodiments, the diffusion model (314) is terminated with a final diffusion block (820), which may be considered one of the D diffusion blocks (815), but contains a final layer configured to properly structure the latent grid noise for removal from the received latent grid data. As seen in FIG. 8, at each diffusion block (815), the latent production data (310) is received and processed with an intermediate representation of the latent grid data in that diffusion block (815) using the attention block. In this way, the noise removal from the latent grid data is guided by the latent production data (and thus the production data). Further, as previously stated, each timestep is encoded using positional encoding to produce a time encoding vector. Following the established notation, the time encoding vector (806) at each time step is given as tk. In general, the time encoding vectors (one for each timestep) are stored in or otherwise contained in the time encoding (315). As seen in FIG. 8, each diffusion block (815) receives the time encoding vector (806) for the given timestep (see Block 810). In this way, the amount of noise to be removed may be specified by picking the corresponding time encoding vector.

Figure 9:
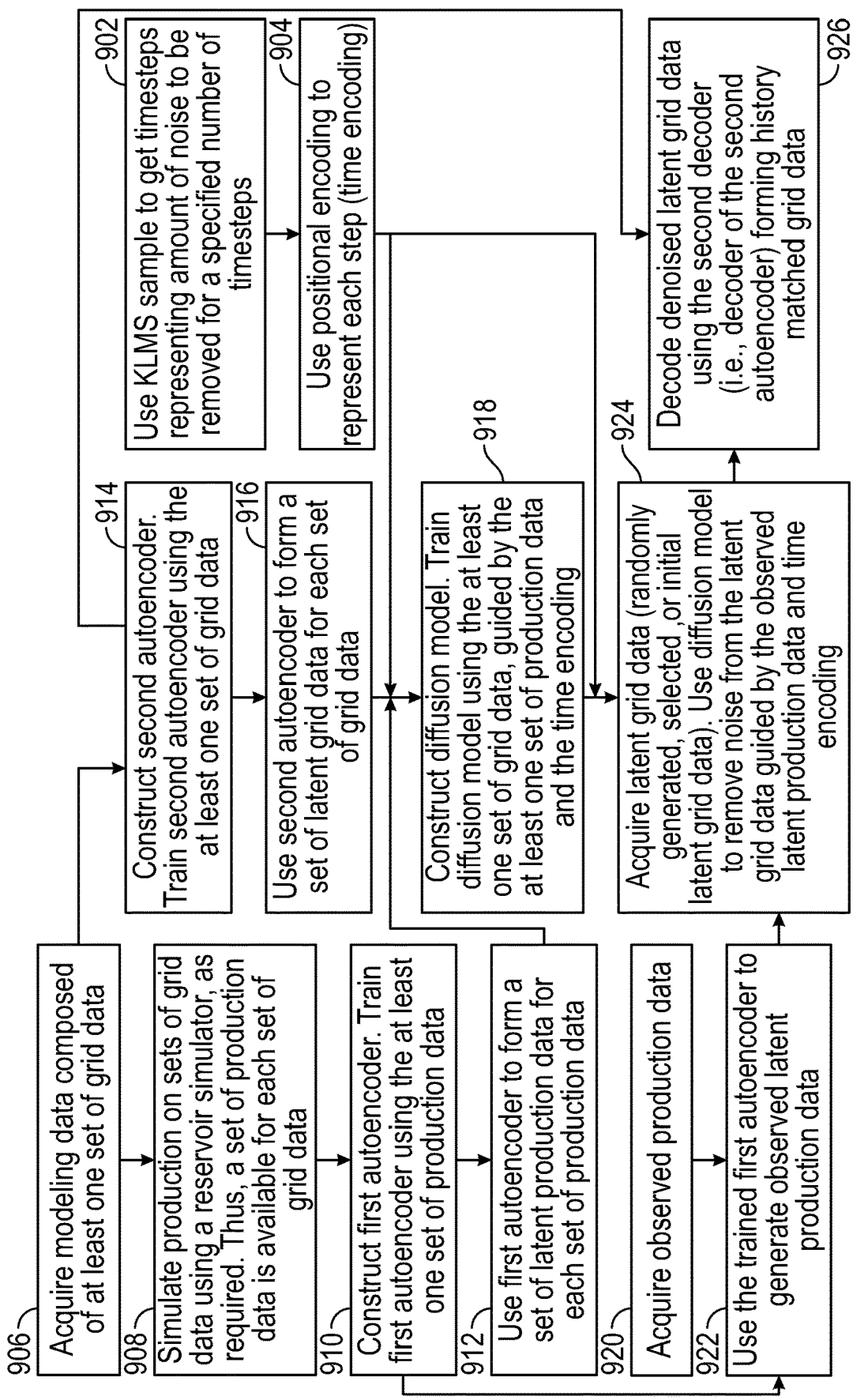
FIG. 9 depicts a flowchart in accordance with one or more embodiments.

FIG. 9 depicts a flowchart outlining the steps for training and using the machine-learned history matching system (300), in accordance with one or more embodiments. In Block 902, a KLMS sampler is used to get a specified number of timesteps that represent, or will indicate to the diffusion model (314), the amount of noise to be removed at each timestep. In one or more embodiments, the number of timesteps is a hyperparameter that is defined by a user. In one or more embodiments, the number of timesteps is a hyperparameter that is learned or tuned while training the diffusion model (314). In Block 904, positional encoding is used to produce a time encoding vector for each timestep for use with the diffusion model (314).

With timesteps specified and encoded, Block 906 acts as the entry point for training the machine-learned history matching system (300), in accordance with one or more embodiments. In Block 906, modeling data is acquired. The modeling data, at least to start with, consists of at least one set of grid data. That is, the modeling data may include grid data for one or more subsurface regions where the grid data for each distinct subsurface region is referred to as a set of grid data. In one or more embodiments, the sets of grid data are synthetically generated. In one or more embodiments, the modeling data consists of at least two sets of grid data and the sets of grid data are highly diverse (i.e., each set of grid data is statistically different from all other sets of grid data in the modeling data). In general, one or more sets of grid data may be generated according to any desired degree of realism. For example, a set of grid data may be generated to mimic, or otherwise be informed by, known grid data over a previously property-mapped subsurface region. For example, a set of grid data may be generated by perturbing a known set of grid data corresponding to an actual, or real, subsurface. In one or more embodiments, a set of grid data that is known not to be congruent with commonly observed geological occurrences may be generated (e.g., a set of grid data with very high spatial property gradients). Further, the modeling data may be composed of at least two sets of grid data where one set is synthetically generated and the other set is acquired from a known subsurface region. In accordance with one or more embodiments, grid data is a three-dimensional digital representation that spatially maps the properties of porosity and permeability over a subsurface.

In one or more embodiments, one or more sets of grid data may also be associated with known, or observed, production data. In instances where production data is not available for a given set of grid data in the modeling data (e.g., a synthetically generated set of grid data), production data for the given set of grid data is obtained using a reservoir simulator, as depicted in Block 908. In one or more embodiments, the production data for each set of grid data includes fluid rates and pressure. Upon implementing Block 908, each set of grid data in the modeling data will have an associated set of production data.

In Block 910, the first autoencoder (305) is constructed and trained. In one or more embodiments, the first autoencoder (305) is a conventional autoencoder (602) such as that depicted in FIG. 6. The first autoencoder (305) is trained using the at least one set of production data The first autoencoder (305) is configured to receive a given set of production data, compress the given set of production data to a latent representation (using the first encoder (306)), and decode, or otherwise attempt to restore, the latent representation back to the original given set of production data (using the first decoder (317)). In general, any known training procedure known in the art may be applied when training the first autoencoder (305) without limitation. For example, when more than one set of production data is available, the sets of production data (or, more generally, the modeling data) may be split into one or more training, validation, and test sets. Thus, hyperparameters governing the first autoencoder (305) may be altered or learned and the performance—or generalization error—of the first autoencoder (305) may be estimated. Further, common training techniques such as cross-validation may be readily applied. For concision, not all training techniques are enumerated herein, however, one with ordinary skill in the art will recognize that this does not impose a limitation on the instant disclosure. In Block 912, with the first autoencoder (305) trained, the first encoder (306) is used to form a set of latent production data for each set of production data. Thus, all sets of production data in the modeling data have a latent representation.

In Block 914, the second autoencoder (307) is constructed and trained. In one or more embodiments, the second autoencoder (307) is a convolutional autoencoder (702) such as that depicted in FIG. 7. The second autoencoder (307) is trained using the at least one set of grid data. The second autoencoder (307) is configured to receive a given set of grid data, compress the given set of grid data to a latent representation (using the second encoder (308)), and decode, or otherwise attempt to restore, the latent representation back to the original given set of grid data (using the second decoder (318)). In general, any known training procedure known in the art may be applied when training the second autoencoder (307) without limitation. For example, when more than one set of grid data is available, the sets of grid data (or, more generally, the modeling data) may be split into one or more training, validation, and test sets. Thus, hyperparameters governing the second autoencoder (307) may be altered or learned and the performance—or generalization error—of the second autoencoder (307) may be estimated. Further, common training techniques such as cross-validation may be readily applied. For concision, not all training techniques are enumerated herein, however, one with ordinary skill in the art will recognize that this does not impose a limitation on the instant disclosure. In Block 916, with the second autoencoder (307) trained, the second encoder (308) is used to form a set of latent grid data for each set of grid data. Thus, all sets of grid data in the modeling data have a latent representation.

With one or more sets of latent grid data and associated latent production data, as well as one or more time encoding vectors, the diffusion model (314) may be trained. In one or more embodiments, noise is randomly added to each set of latent grid data such that a set of latent grid data with added noise and the original set of latent production data may form an input-target pair for training the diffusion model (314). The amount of noise added to each set of latent grid data may be specified by a user or, in one or more embodiments, the amount of noise is determined using a pre-defined probability distribution. In one or more embodiments, noise, in an amount determined according to the timestep (or iteration) is added to each set of latent grid data forming pairs of latent grid data and noisy latent grid data (noise added) for each timestep.

In Block 918, using pairs of noisy and original latent grid data, where a single set of latent grid data may form a pair for each timestep, the diffusion model (314) is trained while being guided by the associated one or more sets of latent production data and the time encoding vectors. Again, in general, any known training procedure known in the art may be applied when training the diffusion model (314) without limitation. For example, training, validation, and test sets may be used. Further, hyperparameters governing the diffusion model (314) (e.g., activation function used, number of diffusion blocks, etc.) may be altered or learned and the performance—or generalization error—of the diffusion model (314) may be estimated. Further, common training techniques such as cross-validation may be readily applied. For concision, not all training techniques are enumerated herein, however, one with ordinary skill in the art will recognize that this does not impose a limitation on the instant disclosure. Upon training the diffusion model (314), the machine-learned history matching system may be deployed and used with observed production data to generate a matching set of grid data (i.e., history matched grid data (320)).

With all component machine-learned models of the machine-learned history matching system (300) trained (i.e., the first autoencoder (305), the second autoencoder (307), and the diffusion model (314)), Block 920 acts as the entry point using the deployed machine-learned history matching system (300). In accordance with one or more embodiments, in Block 920 observed production data is acquired. Here, observed production data refers to production data received from a well and/or reservoir. Further, the observed production data is not present in the modeling data. In Block 922, the first encoder (306) (i.e., the encoder of the trained first autoencoder (305)) is used to transform (i.e., compress) the observed production data to the latent space forming observed latent production data.

In accordance with one or more embodiments, in Block 924, latent grid data is acquired. In one or more embodiments, the latent grid data is generated using a random process. For example, latent grid data may be generated by sampling the latent space of grid data according to a prescribed probability distribution. In other embodiments, the latent grid data is acquired by simply using (i.e., selecting) a set of latent grid data from the modeling data (i.e., latent grid data used during the training and evaluation process). In one or more embodiments, latent grid data is randomly selected from the one or more sets of latent grid data established during training and evaluation. In one or more embodiments, latent grid data is selected from the one or more sets of latent grid data established during training and evaluation according to a similarity metric applied to the observed production data (or observed latent production data) and production data (or latent production data) associated with the one or more sets of latent grid data. In one or more embodiments, initial grid data associated with the observed production data is available. In this case, latent grid data is acquired by processing the initial grid data with the second encoder (308) (i.e., the encoder of the trained second autoencoder (307)). Further, in Block 924, the trained diffusion model (314) is used to remove noise from the latent grid data guided by the observed latent production data and the time encoding established in Blocks 902 and 904. The diffusion model (314) outputs denoised latent grid data. Finally, in Block 926, the denoised latent grid data is decoded using the second decoder (318) (i.e., the decoder of the trained second autoencoder (307)) resulting in history matched grid data (320).

Figure 10:
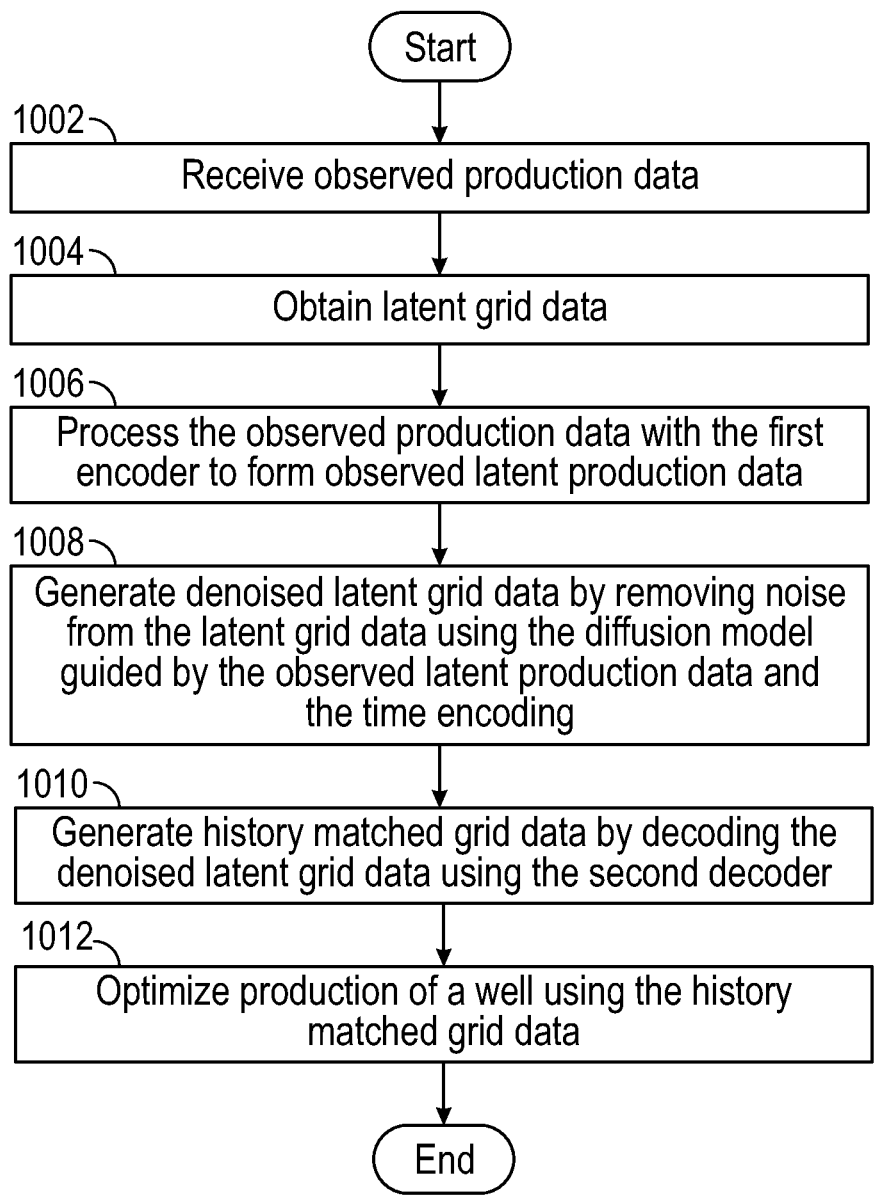
FIG. 10 depicts a flowchart in accordance with one or more embodiments.

FIG. 10 depicts a flowchart for using a trained machine-learned history matching system (300) in accordance with one or more embodiments. In the context of FIG. 10, the trained machine-learned history matching system (300) is structured as depicted in FIG. 3 with a trained first autoencoder (305), a trained second autoencoder (307), and a trained diffusion model (314) that uses an established time encoding (315) that includes at least one time encoding vector, where there is a time encoding vector for each timestep. That is, in the trained machine-learned history matching system (300), the number of timesteps in the trained diffusion model (314) is already defined or determined.

In Block 1002, observed production data is received. The observed production data may include measured production quantities, such as fluid flow rates (which may be multiphase) and pressure, measured from a well and/or reservoir. In Block 1004, latent grid data is acquired. In one or more embodiments, the latent grid data is acquired by randomly generating latent grid data directly in a latent grid data space (i.e. the space spanning all possible grid data compressions with respect to all possible sets of grid data and the architecture of the second encoder (308)). In one or more embodiments, the latent grid data space is sampled, according to a probability distribution over the latent grid data space (e.g., a normal distribution) to generate, and thus acquire, the latent grid data.

In Block 1106, the observed production data is processed with the first encoder (306) to form observed latent production data. Subsequently, in Block 1108, the latent grid data is denoised, forming denoised latent grid data (316), by the diffusion model (314) guided by the observed latent production data and the time encoding (315). In Block 1010, history matched grid data (320) is generated by decoding the denoised latent grid data (316) using the second decoder (318). In Block 1012, the production of a well is optimized using the history matched grid data (320). That is, in one or more embodiments, the history matched grid data (320) describes a subsurface that encompasses a hydrocarbon reservoir that is penetrated by at least one well. Thus, operation of the well to enhance production may be optimized using the history matched grid data (320). In one or more embodiments, a control system that governs the well may automatically alter operational parameters associated with the well (e.g., choke settings) based on the history matched grid data (320) in view of one or more goals. Additional uses of the history matched grid data (320), produced using the machine-learned history matching system (200) described herein, are presented below.

Advantages of embodiments of this disclosure may include one or more of the following. In one or more embodiments, the machine-learned history matching system (200) may further be integrated into comprehensive workflows for model and data uncertainty quantification. In these instances, the space of uncertainty can combine the variability in spatial distribution and trends of static parameters that impact dynamic response, like facies, flow units, faults, fractures as well as the uncertainty in the observed/measured data (e.g., well pressures, rates, production profiles, etc.). When the simulation model is history matched under uncertainty it renders more predictive robustness for production optimization, long-term Field Development Planning, Single-well placement studies, and risk assessment and mitigation.

Another advantage of embodiments of the instant disclosure is that the output of the history matched model (or ensembles of models under uncertainty) can serve as an input to train additional data-driven and/or physics-driven surrogate models (e.g., machine-learned models) that can provide short- or mid-term predictions of the field/well response and spatial-temporal dynamics with significantly reduced time and computational resource expenses compared to full-physics simulations Another advantage of embodiments of the instant disclosure is that the dynamically calibrated or history matched subsurface models (i.e., history matched grid data (320)) are continuously used in Integrated Asset Management workflows as a part of the holistic optimization of modern Digital Oil Field (DOF) assets. Examples include the subsurface-to-surface coupling of (history matched) reservoir simulation models with surface network models (e.g., static/tight or dynamic/loose coupling) that can control well operations, artificial lift, surface chokes, downhole smart completions, etc. Further, repositories of history matched models can be used to build knowledge graph/tree based ontological frameworks that can facilitate engines for case-based reasoning (CBR) or rule-based reasoning (RBR). When history matched under multi-variate uncertainty, the statistically representative ensemble of subsurface models can represent a training set for the modern artificial intelligence (AI) decision engines like recommendation systems.

Figure 11:
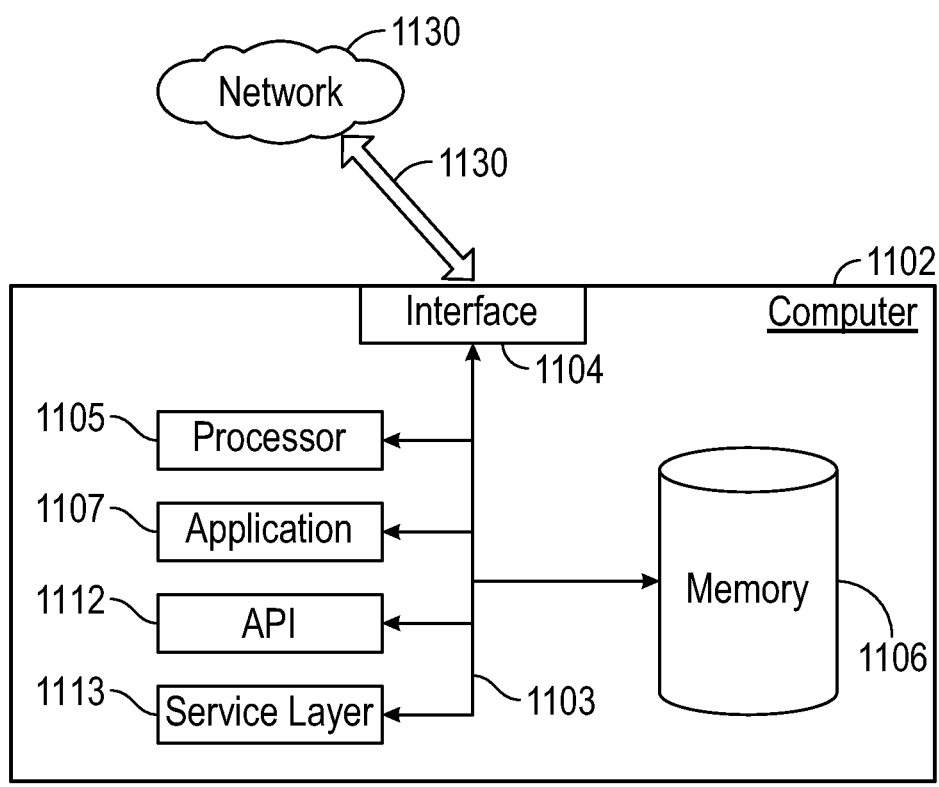
FIG. 11 depicts a system in accordance with one or more embodiments.

FIG. 11 further depicts a block diagram of a computer system (1102) used to provide computational functionalities associated with described algorithms, methods, functions, processes, flows, and procedures as described in this disclosure, according to one or more embodiments. The illustrated computer (1102) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1102) may include a computer that includes an input device, such as a keypad, keyboard, touch screen, or other device that can accept user information, and an output device that conveys information associated with the operation of the computer (1102), including digital data, visual, or audio information (or a combination of information), or a GUI.

The computer (1102) can serve in a role as a client, network component, a server, a database or other persistency, or any other component (or a combination of roles) of a computer system for performing the subject matter described in the instant disclosure. In some implementations, one or more components of the computer (1102) may be configured to operate within environments, including cloud-computing-based, local, global, or other environment (or a combination of environments).

At a high level, the computer (1102) is an electronic computing device operable to receive, transmit, process, store, or manage data and information associated with the described subject matter. According to some implementations, the computer (1102) may also include or be communicably coupled with an application server, e-mail server, web server, caching server, streaming data server, business intelligence (BI) server, or other server (or a combination of servers).

The computer (1102) can receive requests over network (1130) from a client application (for example, executing on another computer (1102) and responding to the received requests by processing the said requests in an appropriate software application. In addition, requests may also be sent to the computer (1102) from internal users (for example, from a command console or by other appropriate access method), external or third-parties, other automated applications, as well as any other appropriate entities, individuals, systems, or computers.

Each of the components of the computer (1102) can communicate using a system bus (1103). In some implementations, any or all of the components of the computer (1102), both hardware or software (or a combination of hardware and software), may interface with each other or the interface (1104) (or a combination of both) over the system bus (1103) using an application programming interface (API) (1112) or a service layer (1113) (or a combination of the API (1112) and service layer (1113). The API (1112) may include specifications for routines, data structures, and object classes. The API (1112) may be either computer-language independent or dependent and refer to a complete interface, a single function, or even a set of APIs. The service layer (1113) provides software services to the computer (1102) or other components (whether or not illustrated) that are communicably coupled to the computer (1102). The functionality of the computer (1102) may be accessible for all service consumers using this service layer. Software services, such as those provided by the service layer (1113), provide reusable, defined business functionalities through a defined interface. For example, the interface may be software written in JAVA, C++, or other suitable language providing data in extensible markup language (XML) format or another suitable format. While illustrated as an integrated component of the computer (1102), alternative implementations may illustrate the API (1112) or the service layer (1113) as stand-alone components in relation to other components of the computer (1102) or other components (whether or not illustrated) that are communicably coupled to the computer (1102). Moreover, any or all parts of the API (1112) or the service layer (1113) may be implemented as child or sub-modules of another software module, enterprise application, or hardware module without departing from the scope of this disclosure.

The computer (1102) includes an interface (1104). Although illustrated as a single interface (1104) in FIG. 11, two or more interfaces (1104) may be used according to particular needs, desires, or particular implementations of the computer (1102). The interface (1104) is used by the computer (1102) for communicating with other systems in a distributed environment that are connected to the network (1130). Generally, the interface (1104) includes logic encoded in software or hardware (or a combination of software and hardware) and operable to communicate with the network (1130). More specifically, the interface (1104) may include software supporting one or more communication protocols associated with communications such that the network (1130) or interface's hardware is operable to communicate physical signals within and outside of the illustrated computer (1102).

The computer (1102) includes at least one computer processor (1105). Although illustrated as a single computer processor (1105) in FIG. 11, two or more processors may be used according to particular needs, desires, or particular implementations of the computer (1102). Generally, the computer processor (1105) executes instructions and manipulates data to perform the operations of the computer (1102) and any algorithms, methods, functions, processes, flows, and procedures as described in the instant disclosure.

The computer (1102) also includes a memory (1106) that holds data for the computer (1102) or other components (or a combination of both) that can be connected to the network (1130). The memory may be a non-transitory computer readable medium. For example, memory (1106) can be a database storing data consistent with this disclosure. Although illustrated as a single memory (1106) in FIG. 11, two or more memories may be used according to particular needs, desires, or particular implementations of the computer (1102) and the described functionality. While memory (1106) is illustrated as an integral component of the computer (1102), in alternative implementations, memory (1106) can be external to the computer (1102).

The application (1107) is an algorithmic software engine providing functionality according to particular needs, desires, or particular implementations of the computer (1102), particularly with respect to functionality described in this disclosure. For example, application (1107) can serve as one or more components, modules, applications, etc. Further, although illustrated as a single application (1107), the application (1107) may be implemented as multiple applications (1107) on the computer (1102). In addition, although illustrated as integral to the computer (1102), in alternative implementations, the application (1107) can be external to the computer (1102).

There may be any number of computers (1102) associated with, or external to, a computer system containing computer (1102), wherein each computer (1102) communicates over network (1130). Further, the term "client," "user," and other appropriate terminology may be used interchangeably as appropriate without departing from the scope of this disclosure. Moreover, this disclosure contemplates that many users may use one computer (1102), or that one user may use multiple computers (1102).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method, comprising:
    obtaining, with a computer processor, observed historical production data measured from a well with a sensor, the well being associated with a subsurface region of interest, wherein the observed historical production data comprises a flow rate of hydrocarbons produced from the well over a period of time;
    determining, with the computer processor, observed latent production data by encoding the observed historical production data using a first encoder of a first autoencoder comprising the first encoder and a first decoder;
    generating, with the computer processor, latent grid data, wherein generating the latent grid data comprises a step selected from a group consisting of:
        obtaining grid data for the subsurface region of interest associated with the well and encoding the grid data using a second encoder of a second autoencoder comprising the second encoder and a second decoder, and
        sampling a latent space of grid data according to a prescribed probability distribution based on the second autoencoder;
    generating, with the computer processor, denoised latent grid data by removing noise from the latent grid data using a diffusion model based on the observed latent production data and a time encoding vector, wherein:
        the first autoencoder, the second autoencoder, and the diffusion model have been trained using modeling data comprising one or more pairs of training grid data and training production data,
        the diffusion model comprises at least one attention block that implements cross-attention between the observed latent production data and an intermediate representation of the latent grid data,
        the diffusion model determines, using the time encoding vector, latent grid noise to be removed from a prior iteration of the latent grid data at each of a predefined number of iterations, wherein the time encoding vector represents an amount of noise that is removed at each iteration, and wherein the denoised latent grid data resides in a latent space of the second autoencoder;
    restoring, by the computer processor, the denoised latent grid data to an uncompressed real space, by decoding the denoised latent grid data using the second decoder of the second autoencoder, resulting in history matched grid data, wherein the history matched grid data comprises a spatial description of a parameter of the subsurface region of interest;
    planning, by the computer processor, a wellbore path for a proposed well to penetrate a hydrocarbon reservoir in the subsurface region of interest by predicting a flow rate of hydrocarbons from the proposed well using a simulator operating with the history matched grid data; and
    drilling, by a drilling system, the proposed well as guided by the planned wellbore path.

2. The method of claim 1, further comprising forecasting, with the computer processor, future production of the hydrocarbon reservoir.

3. The method of claim 1, further comprising generating the time encoding vector using a positional encoding method.

4. The method of claim 1, wherein the history matched grid data comprises a three-dimensional porosity grid or a three-dimensional permeability grid for the subsurface region of interest.

5. The method of claim 1, wherein the observed latent production data is a compressed representation of the observed historical production data.

6. The method of claim 1, wherein the first encoder comprises a neural network.

7. The method of claim 1, wherein the second decoder comprises a convolutional neural network.

8. The method of claim 1, wherein the observed historical production data further comprises a pressure of fluids produced from the well.

9. A system, comprising:
    a well associated with a subsurface region of interest;
    a wellbore planning system;
    a simulator;
    a drilling system configured to drill another well to penetrate the subsurface region of interest; and
    a computer comprising one or more computer processors and a non-transitory computer-readable medium, the computer configured to:
        receive observed historical production data measured from the well with a sensor, wherein the observed historical production data comprises a flow rate of hydrocarbons from the well over a period of time;
        determine observed latent production data by encoding the observed historical production data using a first encoder of a first autoencoder comprising the first encoder and a first decoder;
        generate latent grid data, wherein generating the latent grid data comprises a step selected from a group consisting of:
            obtaining grid data for the subsurface region of interest associated with the well and encoding the grid data using a second encoder of a second autoencoder comprising the second encoder and a second decoder, and
            sampling a latent space of grid data according to a prescribed probability distribution based on the second autoencoder;
        generate denoised latent grid data by removing noise from the latent grid data using a diffusion model based on the observed latent production data and a time encoding vector, wherein:
            the first autoencoder, the second autoencoder, and the diffusion model have been trained using modeling data comprising one or more pairs of training grid data and training production data, the diffusion model comprises at least one attention block that implements cross-attention between the observed latent production data and an intermediate representation of the latent grid data, the diffusion model determines, using the time encoding vector, latent grid noise to be removed from a prior iteration of the latent grid data at each of a predefined number of iterations, wherein the time encoding vector represents an amount of noise that is removed at each iteration, and wherein the denoised latent grid data resides in a latent space of the second autoencoder; and restore the denoised latent grid data to an uncompressed real space by decoding the denoised latent grid data using the second decoder of the second autoencoder, resulting in history matched grid data, wherein the history matched grid data comprises a spatial description of a parameter of the subsurface region of interest, wherein the wellbore planning system plans a wellbore path for the another well to penetrate a hydrocarbon reservoir in the subsurface region of interest by predicting a flow rate of hydrocarbons from the another well using the simulator operating with the history matched grid data, wherein the drilling system drills the wellbore guided by the planned wellbore path.

10. The system of claim 9, wherein the history matched grid data comprises a three-dimensional porosity grid or a three-dimensional permeability grid for the subsurface region of interest.

11. The system of claim 9, wherein the first encoder comprises a first neural network and the first decoder comprises a second neural network.

12. The system of claim 9, wherein the second encoder comprises a first convolutional neural network and the second decoder comprises a second convolutional neural network.

13. The system of claim 9, wherein the observed historical production data further comprises a pressure of fluids produced from the well.

14. A non-transitory computer readable medium storing instructions executable by a computer processor, the instructions comprising functionality for:

receiving observed historical production data from a well being associated with a subsurface region of interest, wherein the observed historical production data comprises a flow rate of hydrocarbons produced from the well over a period of time;

determining observed latent production data by encoding the observed historical production data using a first encoder of a first autoencoder comprising the first encoder and a first decoder;

generating latent grid data, wherein generating the latent grid data comprises a step selected from a group consisting of:

obtaining grid data for the subsurface region of interest associated with the well and encoding the grid data using a second encoder of a second autoencoder comprising the second encoder and a second decoder, and sampling a latent space of grid data according to a prescribed probability distribution based on the second autoencoder;

generating denoised latent grid data by removing noise from the latent grid data using a diffusion model based on the observed latent production data and a time encoding vector, wherein:

the first autoencoder, the second autoencoder, and the diffusion model have been trained using modeling data comprising one or more pairs of training grid data and training production data, the diffusion model comprises at least one attention block that implements cross-attention between the observed latent production data and an intermediate representation of the latent grid data, the diffusion model determines, using the time encoding vector, latent grid noise to be removed from a prior iteration of the latent grid data at each of a predefined number of iterations, wherein the time encoding vector represents an amount of noise that is removed at each iteration, and wherein the denoised latent grid data resides in a latent space of the second autoencoder;

restoring the denoised latent grid data to an uncompressed real space by decoding the denoised latent grid data using the second decoder of the second autoencoder, resulting in history matched grid data, wherein the history matched grid data comprises a spatial description of a parameter of the subsurface region of interest; and planning a wellbore path for a proposed well to penetrate a hydrocarbon reservoir in the subsurface region of interest by predicting a flow rate of hydrocarbons from the proposed well using a simulator operating with the history matched grid data, drilling, with a drilling system, the proposed well as guided by the planned wellbore path.

15. The non-transitory computer readable medium of claim 14, wherein the observed historical production data further comprises a pressure of fluids produced from the well.

16. The method of claim 1, further comprising:

simulating a predicted flow rate of hydrocarbons from the well using the simulator based on a fluid injection, wherein the subsurface region of interest is represented in the simulator by the history matched grid data;

determining, based on the predicted flow rate of hydrocarbons from the well, an optimal fluid injection that optimizes the predicted flow rate of hydrocarbons from the well; and injecting a fluid into the subsurface region of interest according to the optimal fluid injection.

17. The system of claim 9, further comprising:

an injection well in communication with the computer and configured to inject a fluid into the subsurface region of interest, wherein the computer is further configured to:

simulate a predicted flow rate of hydrocarbons from the well using the reservoir simulator based on a fluid injection, wherein the subsurface region of interest is represented in the simulator by the history matched grid data;

determine, based on the predicted flow rate of hydrocarbons from the well, an optimal fluid injection that optimizes the predicted flow rate of hydrocarbons from the well; and inject, using a control system of the injection well, a fluid into the subsurface region of interest according to the optimal fluid injection.

* * * * *